United States Patent
Kim et al.

(10) Patent No.: US 9,716,539 B2
(45) Date of Patent: Jul. 25, 2017

(54) METHOD AND DEVICE FOR REPORTING CHANNEL STATE INFORMATION IN WIRELESS COMMUNICATION SYSTEM

(71) Applicant: LG ELECTRONICS INC., Seoul (KR)

(72) Inventors: Kijun Kim, Anyang-si (KR); Jonghyun Park, Anyang-si (KR); Hanbyul Seo, Anyang-si (KR); Hanjun Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/406,976

(22) PCT Filed: Jul. 2, 2013

(86) PCT No.: PCT/KR2013/005854
§ 371 (c)(1),
(2) Date: Dec. 10, 2014

(87) PCT Pub. No.: WO2014/007512
PCT Pub. Date: Jan. 9, 2014

(65) Prior Publication Data
US 2015/0162966 A1    Jun. 11, 2015

Related U.S. Application Data

(60) Provisional application No. 61/667,406, filed on Jul. 2, 2012, provisional application No. 61/730,032, filed
(Continued)

(51) Int. Cl.
*H04L 1/00*     (2006.01)
*H04B 7/06*     (2006.01)
(Continued)

(52) U.S. Cl.
CPC ......... *H04B 7/0626* (2013.01); *H04B 7/0452* (2013.01); *H04B 7/0456* (2013.01);
(Continued)

(58) Field of Classification Search
CPC .... H04B 7/0626; H04B 7/0452; H04B 7/067; H04B 7/0617; H04B 17/00; H04W 24/08; H04L 5/0053
See application file for complete search history.

(56) References Cited

U.S. PATENT DOCUMENTS

2008/0298482 A1    12/2008   Rensburg et al.
2010/0238824 A1*    9/2010   Farajidana ........... H04B 7/0417
                                                 370/252
(Continued)

FOREIGN PATENT DOCUMENTS

CN    101682380    3/2010
CN    102204141    9/2011
(Continued)

OTHER PUBLICATIONS

PCT International Application No. PCT/KR2013/005854, Written Opinion of the International Searching Authority dated Oct. 18, 2013, 15 pages.
(Continued)

*Primary Examiner* — Abdelnabi O Musa
(74) *Attorney, Agent, or Firm* — Lee Hong Degerman Kang Waimey

(57) ABSTRACT

A method of reporting channel state information (CSI) on a terminal in which a plurality of CSI processes are configured in a wireless communication system according to an embodiment of the present invention includes: measuring a channel based on a CSI reference signal (RS) resource related to one of the CSI processes; measuring interference based on a CSI-interference measurement (IM) resource
(Continued)

related to the CSI process; determining CSI based on the measured channel and the measured interference; and reporting the CSI through an uplink channel, wherein a codebook for reporting the CSI, which is used for determining the CSI, is one of two or more codebooks that correspond independently to each of the CSI processes.

9 Claims, 19 Drawing Sheets

Related U.S. Application Data on Nov. 26, 2012, provisional application No. 61/757,641, filed on Jan. 28, 2013.

(51) Int. Cl.
| | | |
|---|---|---|
| H04B 17/00 | (2015.01) | |
| H04B 7/0456 | (2017.01) | |
| H04B 7/0452 | (2017.01) | |
| H04L 5/00 | (2006.01) | |
| H04W 24/08 | (2009.01) | |

(52) U.S. Cl.
CPC .......... *H04B 7/0617* (2013.01); *H04B 17/00* (2013.01); *H04L 5/0053* (2013.01); *H04W 24/08* (2013.01)

(56) References Cited

U.S. PATENT DOCUMENTS

| | | | | |
|---|---|---|---|---|
| 2013/0058424 A1* | 3/2013 | Enescu | ................ | H04B 7/0486 375/267 |
| 2013/0083681 A1* | 4/2013 | Ebrahimi Tazeh Mahalleh | .............. | H04L 5/0057 370/252 |
| 2013/0242902 A1* | 9/2013 | Liu | ...................... | H04W 24/10 370/329 |
| 2013/0301450 A1* | 11/2013 | Geirhofer | .............. | H04B 7/024 370/329 |
| 2013/0322376 A1* | 12/2013 | Marinier | ............... | H04W 72/06 370/329 |
| 2013/0329772 A1* | 12/2013 | Wernersson | ............. | H01Q 3/00 375/219 |
| 2014/0112173 A1* | 4/2014 | Hammarwall | ........ | H04L 1/0026 370/252 |

FOREIGN PATENT DOCUMENTS

| | | |
|---|---|---|
| KR | 10-2011-0127054 | 11/2011 |
| KR | 10-2011-0138742 | 12/2011 |
| KR | 10-2012-0029338 | 3/2012 |
| WO | 2011/115421 | 9/2011 |
| WO | 2012036503 | 3/2012 |

OTHER PUBLICATIONS

New Postcom, "Feedback enhancements for CoMP," 3GPP TSG RAN WG1 Meeting #66, R1-112148, Aug. 2011, 7 pages.
PCT International Application No. PCT/KR2013/005854, Written Opinion of the International Searching Authority dated Oct. 18, 2013, 13 pages.
Huawei, et al., "Signaling and UE Behaviors for Resource-Specific CSI Measurements," 3GPP TSG RAN WG1 meeting #63, R1-105852, Nov. 2010, 4 pages.
Huawei, et al., "CSI Feedback modes for CoMP," 3GPP TSG RAN WG1 Meeting #69, R1-121946, May 2012, 4 pages.
Alcaltel-Lucent Shanghai Bell, et al., "Considerations on CSI feedback enhancements for high-priority antenna configurations," 3GPP TSG-RAN WG1 #66, R1-112420, Aug. 2011, 8 pages.
European Patent Office Application Serial No. 13813772.4, Search Report dated Jan. 27, 2016, 11 pages.
The State Intellectual Property Office of the People's Republic of China Application Serial No. 201380035306.4, Office Action dated Dec. 5, 2016, 19 pages.
The State Intellectual Property Office of the People's Republic of China Application Serial No. 201380035306.4, Office Action dated Apr. 25, 2017, 18 pages.

* cited by examiner

FIG. 5
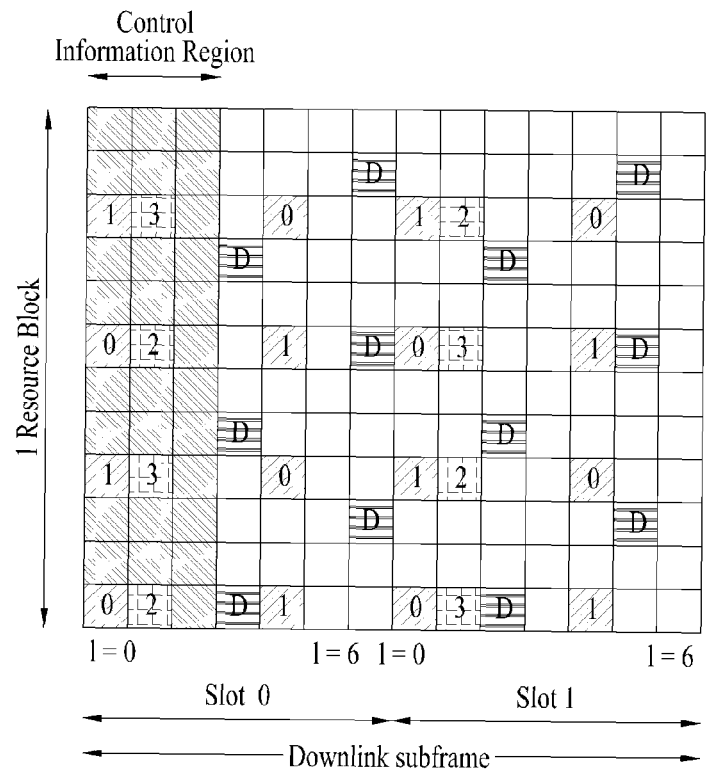
(a)
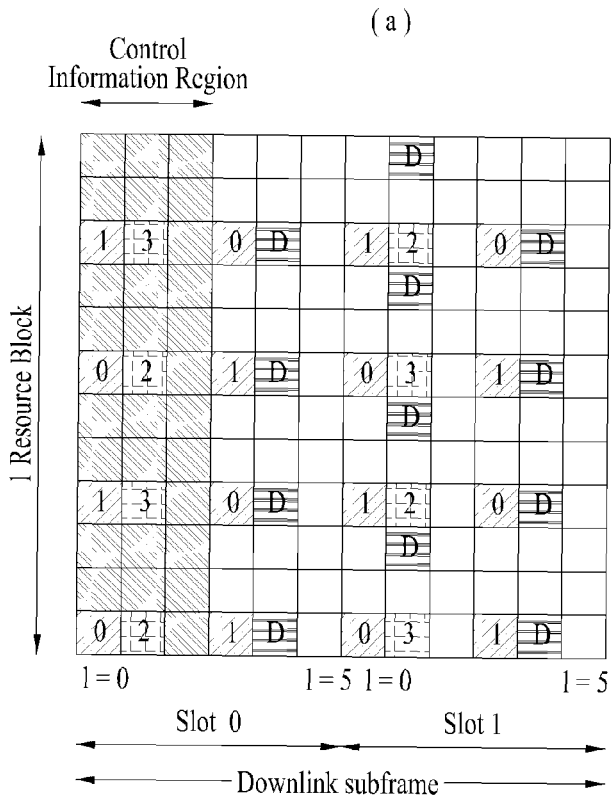
(b)

FIG. 11
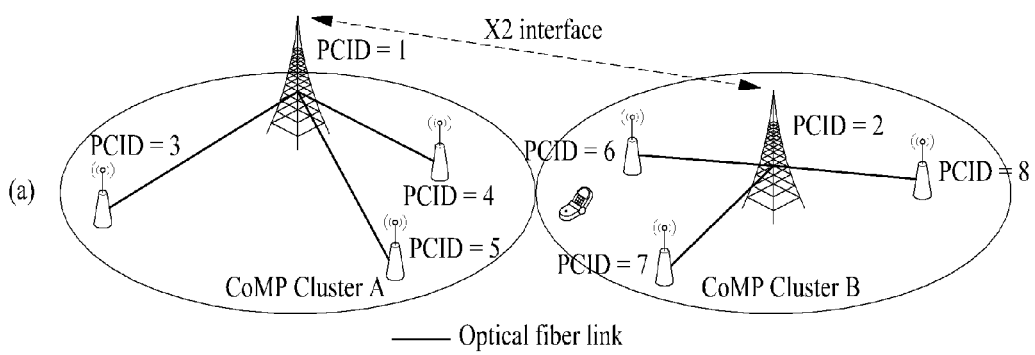
(a)
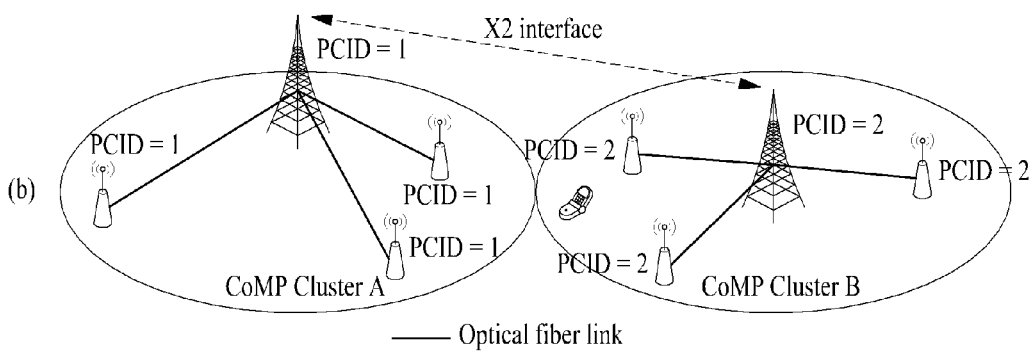
(b)

FIG. 13

FIG. 17
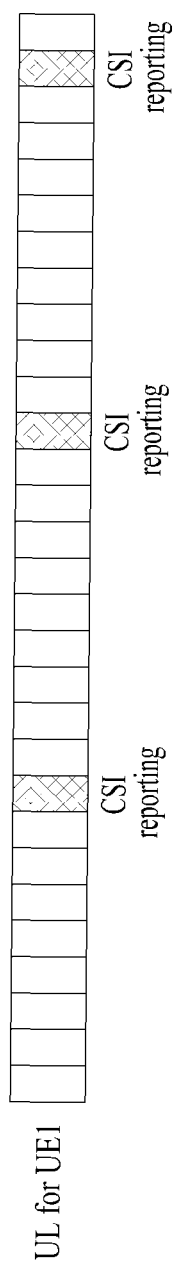
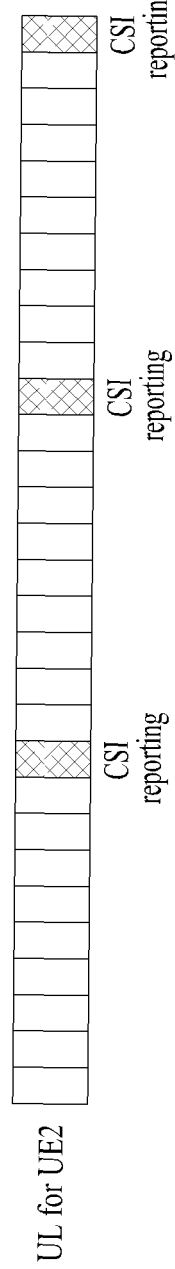

FIG. 21

METHOD AND DEVICE FOR REPORTING CHANNEL STATE INFORMATION IN WIRELESS COMMUNICATION SYSTEM

CROSS-REFERENCE TO RELATED APPLICATIONS

This application is the National Stage filing under 35 U.S.C. 371 of International Application No. PCT/KR2013/005854, filed on Jul. 2, 2013, which claims the benefit of U.S. Provisional Application Ser. Nos. 61/667,406, filed on Jul. 2, 2012, 61/730,032, filed on Nov. 26, 2012, and 61/757,641, filed on Jan. 28, 2013, the contents of which are all hereby incorporated by reference herein in their entirety.

TECHNICAL FIELD

The present disclosure relates to a wireless communication system and, more particularly, to a method and apparatus for transmitting channel state information.

BACKGROUND ART

Wireless communication systems are widely deployed to provide various kinds of communication content such as voice and data. Generally, these communication systems are multiple access systems capable of supporting communication with multiple users by sharing available system resources (e.g., bandwidth and transmission power). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency-division multiple access (SC-FDMA) system, and a multi-carrier frequency division multiple access (MC-FDMA) system.

DISCLOSURE

Technical Problem

An object of the present invention devised to solve the problem lies in a aperiodic transmission method for reducing overhead of transmission of a reference signal and a method and device for reporting relevant channel state information.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

According to a first aspect of the present invention, provided herein is a method for reporting channel state information (CSI) by a user equipment (UE) having a plurality of CSI processes in a wireless communication system, the method including measuring a channel based on a CSI-reference signal (CSI-RS) resource associated with one CSI process of the plurality of CSI processes, measuring an interference based on a CSI-interference measurement (CSI-IM) resource associated with the one CSI process, determining the CSI based on the measured channel and interference, and reporting the CSI over an uplink channel, wherein a codebook for the reporting of the CSI is one of two or more codebooks each independently corresponding to each of the plurality of CSI processes, the codebook being used in determining the CSI.

According to a second aspect of the present invention, provided herein is a user equipment (UE) having a plurality of channel state information (CSI) processes configured in a wireless communication system, the UE including a receive module, and a processor, wherein the processor is configured to measure a channel based on a CSI-reference signal (CSI-RS) resource associated with one CSI process of the plurality of CSI processes, measure an interference based on a CSI-interference measurement (CSI-IM) resource associated with the one CSI process, determine the CSI based on the measured channel and interference, and report the CSI over an uplink channel, wherein a codebook for reporting of the CSI is one of two or more codebooks each independently corresponding to each of the plurality of CSI processes, the codebook being used in determining the CSI.

The first and second aspects of the present invention may include the following details.

The determining may include determining a precoding matrix from the codebook for the reporting of the CSI corresponding to the one CSI process.

The two or more codebooks may reflect channel environments depending on different beamformings.

The CSI-IM resource may be indicated by either a CSI-IM resource configuration including subframes having same interference characteristics or a CSI-IM resource configuration including subframes having different interference characteristics.

The UE may receive information about whether or not averaging interferences measured in a plurality of subframes corresponding to the CSI-IM resource is allowed.

The information may be delivered through radio resource control (RRC) signaling.

A signal for a Multi User-Multi Input Multi Output (MU-MIMO)-paired UE may be transmitted in a portion of subframes corresponding to the CSI-IM resource.

The signal for the MU-MIMO paired UE may be either a PDSCH for the MU-MIMO-paired UE or a dummy signal obtained by applying a precoding matrix associated with the MU-MIMO-paired UE.

The CSI-IM resource may be indicated by either a CSI-IM resource configuration including subframes having same channel characteristics or a CSI-IM resource configuration including subframes having different channel characteristics.

The different channel characteristics may result from change of an antenna virtualization matrix used in transmitting a CSI-RS corresponding to the CSI-RS resource.

The measuring of the channel may be performed using a non-zero power CSI-RS amongto the CSI-RS resource, and the measuring of the interference is performed using a zero-power CSI-RS amongto the CSI-IM resource.

The uplink channel may be one of a physical uplink shared channel (PUSCH) and a physical uplink control channel (PUCCH).

Advantageous Effects

According to embodiments of the present invention, overhead may be reduced and a larger number of channel state information-reference signals (CSI-RSs) may be transmitted. In addition, a UE may efficiently perform channel state reporting related to transmission of CSI-RSs.

It will be appreciated by those skilled in the art that the effects that can be achieved with the present invention are not limited to what has been described above and other advantages of the present invention will be clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention. In the drawings:

FIG. 5 illustrates a reference signal;

FIG. 11 is a diagram illustrating a coordinated multi-point cluster to which an embodiment of the present invention is applicable;

FIG. 13 illustrates aperiodic CSI-RS transmission according to one embodiment of the present invention;

FIGS. 17 and 18 illustrate interference measurement according to one embodiment of the present invention;

FIG. 21 is a diagram illustrating a subframe set and IMR configuration; and

BEST MODE

Figure 1:
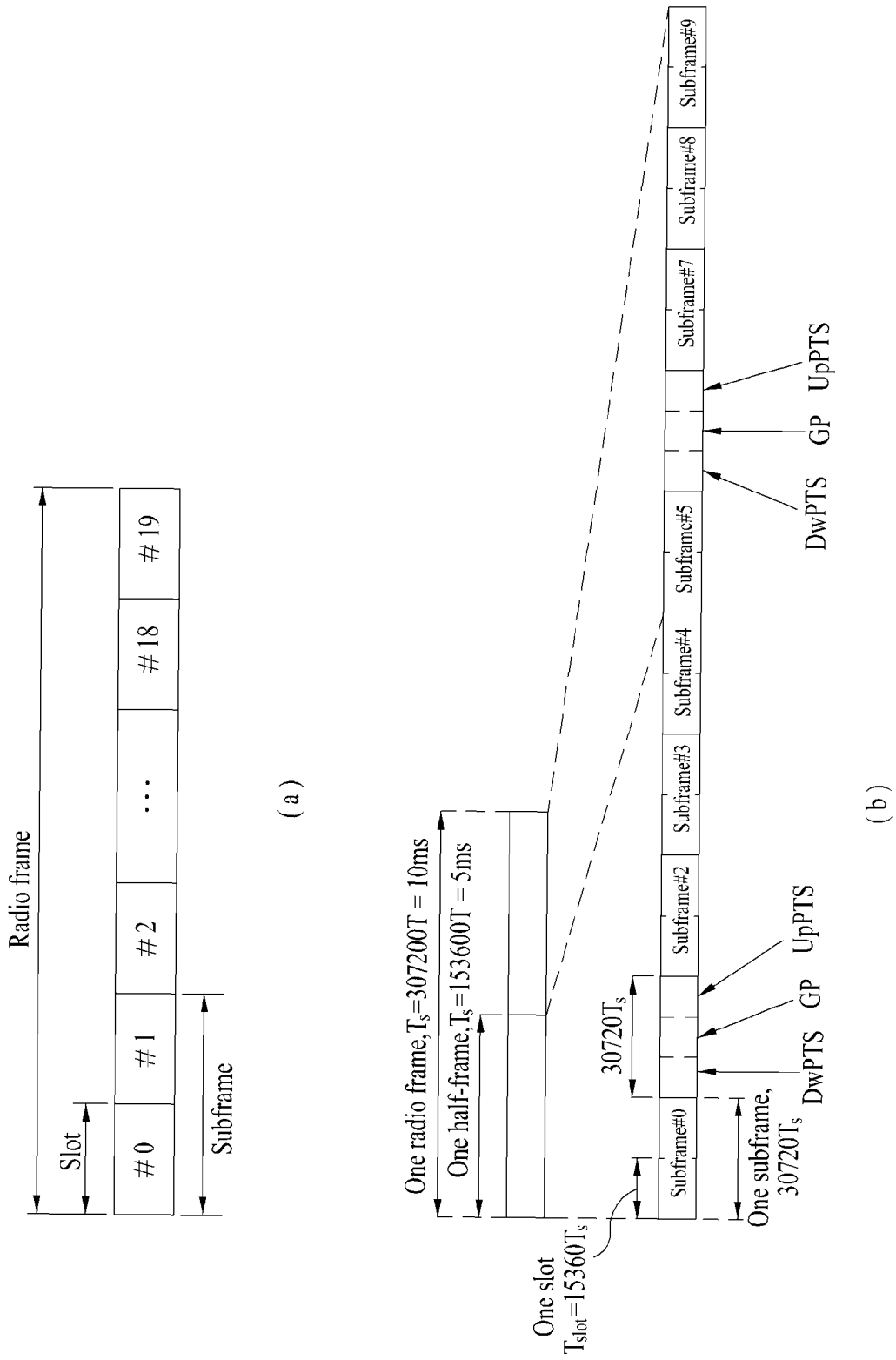
FIG. 1 illustrates a radio frame structure.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may be included in another embodiment, or may be replaced by corresponding elements or features of another embodiment.

Embodiments of the present invention will be described focusing on a data communication relationship between a base station and a terminal. The base station serves as a terminal node of a network over which the base station directly communicates with the terminal. Specific operations illustrated as being conducted by the base station in this specification may be conducted by an upper node of the base station, as necessary.

In other words, it will be obvious that various operations allowing for communication with the terminal in a network composed of several network nodes including the base station can be conducted by the base station or network nodes other than the base station. The term "base station (BS)" may be replaced with terms such as "fixed station," "Node-B," "eNode-B (eNB)," and "access point". The term "relay" may be replaced with such terms as "relay node (RN)" and "relay station (RS)". The term "terminal" may also be replaced with such terms as "user equipment (UE)," "mobile station (MS)," "mobile subscriber station (MSS)" and "subscriber station (SS)". The name "cell" adopted in the following descriptions may be applied to transmission/reception points such as a base station (or eNB), a sector, a remote radio head (RRH), and a relay, and may be used a general term to identify a component carrier at a specific transmission/reception point.

It should be noted that specific terms disclosed in the present invention are proposed for convenience of description and better understanding of the present invention, and these specific terms may be changed to other formats within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through wireless technologies such as universal terrestrial radio access (UTRA) or CDMA2000. TDMA may be embodied through wireless technologies such as global system for mobile communication (GSM)/general packet radio service (GPRS)/enhanced data rates for GSM evolution (EDGE). OFDMA may be embodied through wireless technologies such as IEEE 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e (wirelessMAN-OFDMA reference system) and IEEE 802.16m advanced (wirelessMAN-OFDMA advanced system). For clarity, the following description focuses on 3GPP LTE and 3GPP LTE-A systems. However, the spirit of the present invention is not limited thereto.

LTE/LET-A Resource Structure/Channel

Hereinafter, a radio frame structure will be described with reference to FIG. 1.

In a cellular OFDM wireless packet communication system, an uplink (UL)/downlink (DL) data packet is transmitted on a subframe-by-subframe basis, and one subframe is defined as a predetermined time interval including a plurality of OFDM symbols. 3GPP LTE supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and includes a plurality of resource blocks (RBs) in the frequency domain. Since 3GPP LTE employs OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol is extended and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 1(b) illustrates the type-2 radio frame structure. The type-2 radio frame includes two half frames, each of which has 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and UL transmission synchronization in a UE. The GP is provided to eliminate interference taking place in UL due to multipath delay of a DL signal between DL and UL. Regardless of the type of a radio frame, a subframe of the radio frame includes two slots.

The illustrated radio frame structures are merely examples, and various modifications may be made to the number of subframes included in a radio frame, the number of slots included in a subframe, or the number of symbols included in a slot.

Figure 2:
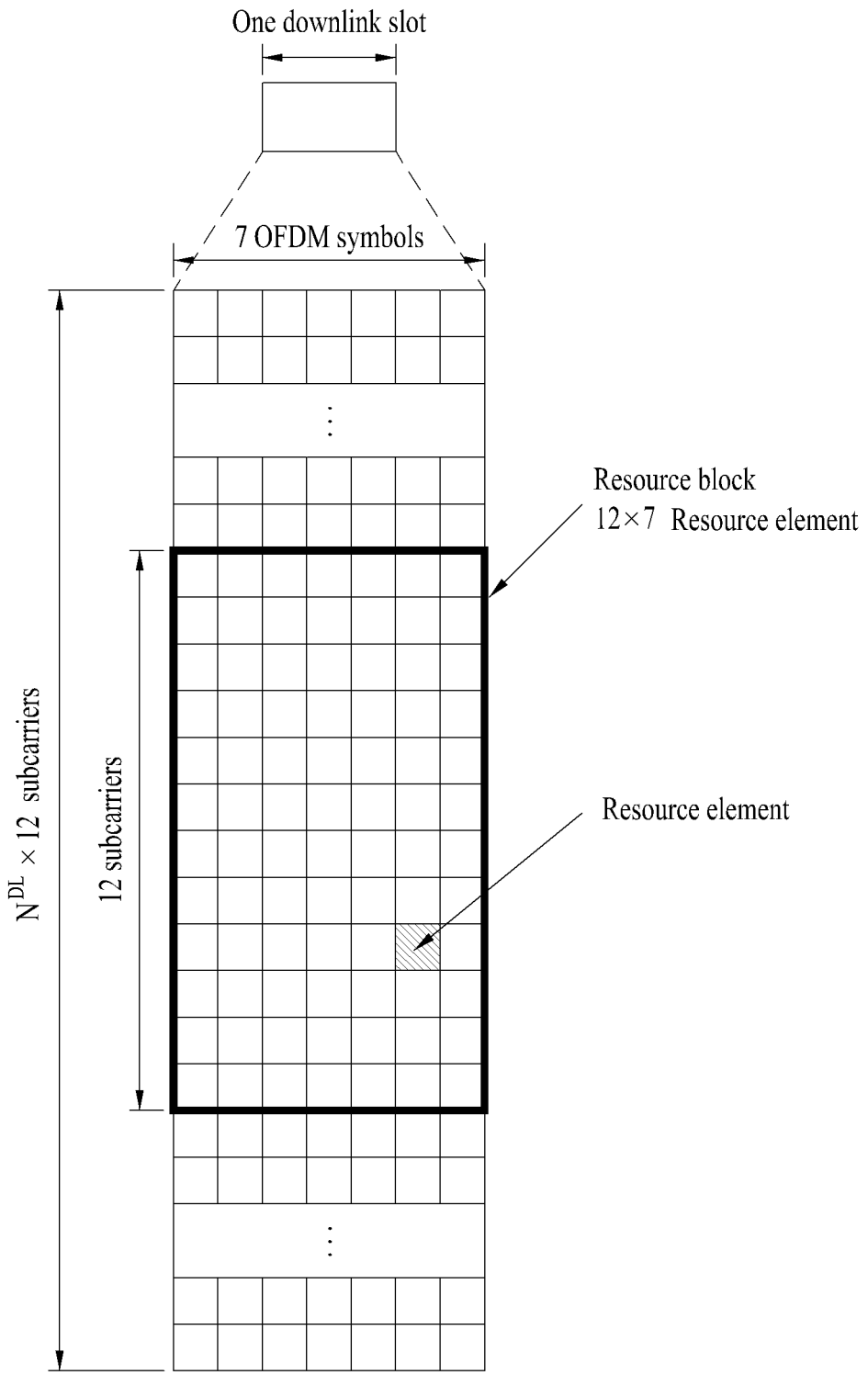
FIG. 2 is a diagram illustrating a resource grid for one downlink (DL) slot.

FIG. 2 is a diagram illustrating a resource grid for one DL slot. A DL slot includes 7 OFDM symbols in the time domain and an RB includes 12 subcarriers in the frequency domain. However, embodiments of the present invention are not limited thereto. For a normal CP, a slot may include 7 OFDM symbols. For an extended CP, a slot may include 6 OFDM symbols. Each element in the resource grid is referred to as a resource element (RE). An RB includes 12×7 REs. The number NDL of RBs included in a downlink slot depends on a DL transmission bandwidth. A UL slot may have the same structure as a DL slot.

Figure 3:
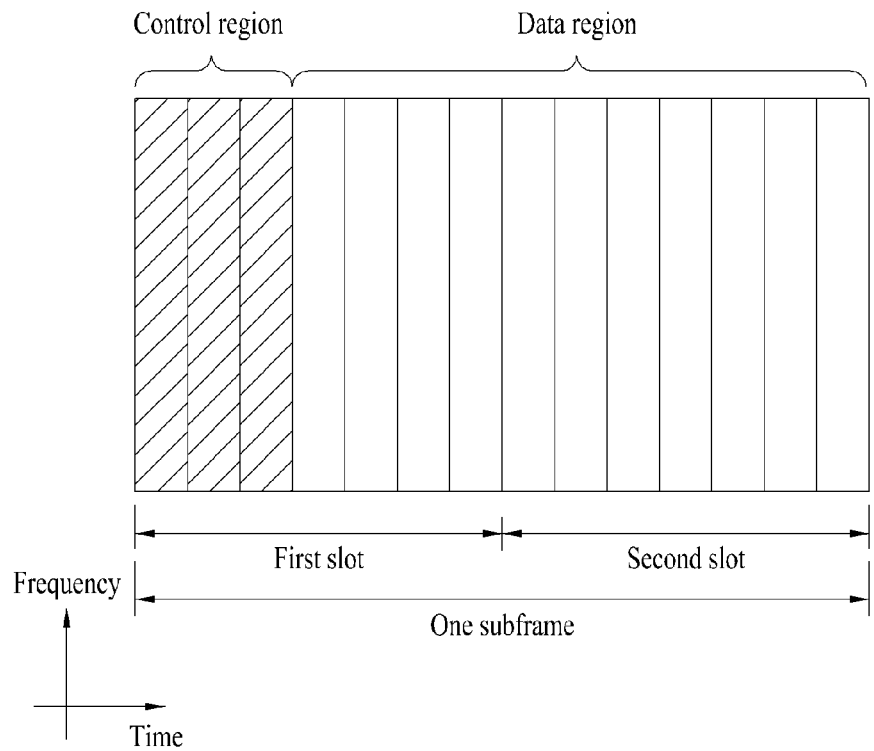
FIG. 3 is a diagram illustrating a DL subframe structure.

FIG. 3 illustrates a DL subframe structure. Up to the first three OFDM symbols of the first slot in a DL subframe are used as a control region to which control channels are allocated and the other OFDM symbols of the DL subframe are used as a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted in the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or UL transmission power control commands for UE groups. The PDCCH delivers information about resource allocation and a transport format for a DL shared channel (DL-SCH), resource allocation information about a UL shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, and voice over internet protocol (VoIP) activation information. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and a coding rate provided by the CCEs. An eNB determines the PDCCH format according to DCI transmitted to a UE and adds a cyclic redundancy check (CRC) to the control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging radio network temporary identifier (P-RNTI). If the PDCCH delivers system information, particularly, a system information block (SIB), the CRC thereof may be masked by a system information ID and a system information RNTI (SI-RNTI). To indicate that the PDCCH delivers a random access response in response to a random access preamble transmitted by a UE, the CRC thereof may be masked by a random access-RNTI (RA-RNTI).

Figure 4:
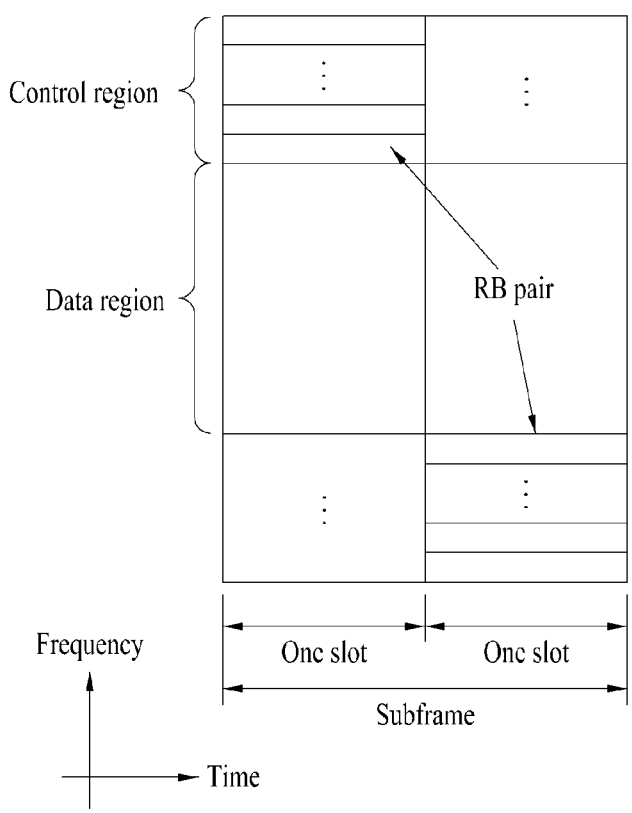
FIG. 4 is a diagram illustrating an uplink (UL) subframe structure.

FIG. 4 illustrates a UL subframe structure. A UL subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs of the RB pair occupy different subcarriers in two slots. This is often called frequency hopping of the RB pair allocated to the PUCCH over a slot boundary.

Reference Signal (RS)

In transmitting packets in a wireless communication system, the packets are transmitted over a radio channel, and therefore signal distortion may occur in the transmission process. For a receiver to receive the correct signal in spite of signal distortion, the received distorted signal should be corrected using channel information. In detecting the channel information, a signal which is known to both the transmitter and the receiver is transmitted and the degree of distortion of the signal received over the channel is used to detect the channel information. This signal is referred to as a pilot signal or a reference signal.

In the case in which data is transmitted and received using multiple antennas, a channel state between a transmit antenna and a receive antenna needs to be identified to receive a correct signal. Accordingly, a separate RS is needed for each transmit antenna and, more particularly, for each antenna port.

RSs may be divided into an UL RS and a DL RS. In the current LTE system, the UL RSs include:

i) a demodulation-reference signal (DM-RS) for channel estimation for coherent demodulation of information transmitted over a PUSCH and a PUCCH; and ii) a sounding reference signal (SRS) for measuring UL channel quality at frequencies of different networks in the BS.

The DL RSs include:

i) a cell-specific reference signal (CRS) shared by all UEs in a cell;

ii) a UE-specific reference signal for a specific UE;

iii) a demodulation-reference signal (DM-RS) transmitted for coherent demodulation in the case of transmission of a PDSCH;

iv) a channel state information-reference signal (CSI-RS) for delivering channel state information (CSI) in the case of transmission of a DL DMRS;

v) a multimedia broadcast single frequency network (MB-SFN) reference signal transmitted for coherent demodulation of a signal transmitted in an MB SFN mode, and vi) a positioning reference signal used to estimate geographic position information of a UE.

The RSs may be broadly divided into two reference signals according to the purposes thereof. There are an RS used to acquire channel information and an RS used for data demodulation. Since the former is used when the UE acquires channel information on DL, this RS should be transmitted over a wide band and even a UE which does not receive DL data in a specific subframe should receive the RS. This RS is also applied to situations such as handover. The latter RS is sent by the BS along with a resource on DL. The UE may receive the RS to perform channel measurement to implement data modulation. This RS should be transmitted in a region in which data is transmitted.

The CRS is used for acquisition of channel information and for data demodulation, and the UE-specific RS is used only for data demodulation. The CRS is transmitted in every subframe in a wide band and RSs for up to four antenna ports are transmitted according to the number of transmit antennas of the BS.

For example, if the number of transmit antennas of the BS is 2, CRSs for antenna ports #0 and #1 are transmitted. If the number of transmit antennas of the BS is 4, CRSs for antenna ports #0 to #3 are respectively transmitted.

FIG. 5 is a diagram illustrating a pattern in which CRSs and DRSs defined in a legacy 3GPP LTE system (e.g., Release-8) are mapped to resource block (RB) pairs. A downlink RB pair, as a unit to which an RS is mapped, may be represented as a unit of one subframe in the time domain times 12 subcarriers in the frequency domain. That is, one RB pair has a length of 14 OFDM symbols for a normal CP (FIG. 5(a)) and a length of 12 OFDM symbols for an extended CP (FIG. 5(b)).

FIG. 5 shows locations of RSs on RB pairs in a system in which the BS supports four transmit antennas. In FIG. 5, resource elements (REs) denoted by "0", "1", "2" and "3" represent the locations of the CRSs for antenna port indexes 0, 1, 2 and 3, respectively. In FIG. 5, REs denoted by "D" represent locations of the DMRSs.

Channel State Information-RS (CSI-RS)

The CSI-RS, which is designed for the LTE-A system supporting up to eight antenna ports on downlink, is a reference signal intended for channel measurement. The CSI-RS is different from the CRS which is intended for channel measurement and data demodulation. Accordingly, the CSI-RS does not need to be transmitted in every subframe, unlike the CRS. The CSI-RS is used in transmission mode 9, and the DMRS is transmitted for data demodulation.

More specifically, the CSI-RS may be transmitted through antenna ports 1, 2, 4, and 8. When one antenna port is used, it may be antenna port #15. When two antenna ports are used, they may be antenna ports #15 and #16. When four antenna ports are used, they may be antenna ports #15 to #18. When eight antenna ports are used, they may be antenna ports #15 to #22.

A CSI-RS may be generated using Equation 1 given below.

$$r_{l,n_s}(m) = \frac{1}{\sqrt{2}}(1 - 2 \cdot c(2m)) + j\frac{1}{\sqrt{2}}(1 - 2 \cdot c(2m+1)),$$ Equation 1

$$m = 0, 1, \cdots, N_{RB}^{max,DL} - 1$$

Herein, $r_{l,n_s}(m)$ denotes a generated CSI-RS, $c(i)$ denotes a pseudo random sequence, $n_s$ denotes the slot number, $l$ denotes an OFDM symbol, and $N_{RB}^{max,DL}$ denotes the maximum number of RBs of a DL bandwidth.

The CSI-RS generated through Equation 1 may be mapped to an RE for each antenna port, using Equation 2.

$$a_{k,l}^{(p)} = w_{l''} \cdot r_{l,n_s}(m')$$ Equation 2

$$k = k' + 12m +
\begin{cases}
-0 & \text{for } p \in \{15, 16\}, \text{ normal cyclic prefix} \\
-6 & \text{for } p \in \{17, 18\}, \text{ normal cyclic prefix} \\
-1 & \text{for } p \in \{19, 20\}, \text{ normal cyclic prefix} \\
-7 & \text{for } p \in \{21, 22\}, \text{ normal cyclic prefix} \\
-0 & \text{for } p \in \{15, 16\}, \text{ extended cyclic prefix} \\
-3 & \text{for } p \in \{17, 18\}, \text{ extended cyclic prefix} \\
-6 & \text{for } p \in \{19, 20\}, \text{ extended cyclic prefix} \\
-9 & \text{for } p \in \{21, 22\}, \text{ extended cyclic prefix}
\end{cases}$$

$$l = l' +
\begin{cases}
l'' & \text{CSI reference signal configurations 0-19, normal cyclic prefix} \\
2l'' & \text{CSI reference signal configurations 20-31, normal cyclic prefix} \\
l'' & \text{CSI reference signal configurations 0-27, extended cyclic prefix}
\end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \cdots, N_{RB}^{DL} - 1$$

$$m' = m + \left\lfloor \frac{N_{RB}^{max,DL} - N_{RB}^{DL}}{2} \right\rfloor$$

In Equation 2, k' and l' may be determined according to CSI-RS configurations as shown in Table 1.

TABLE 1

| | | Number of CSI reference signals configured | | | | | |
|---|---|---|---|---|---|---|---|
| CSI reference signal | | 1 or 2 | | 4 | | 8 | |
| | configuration | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

Figures 6, 7:
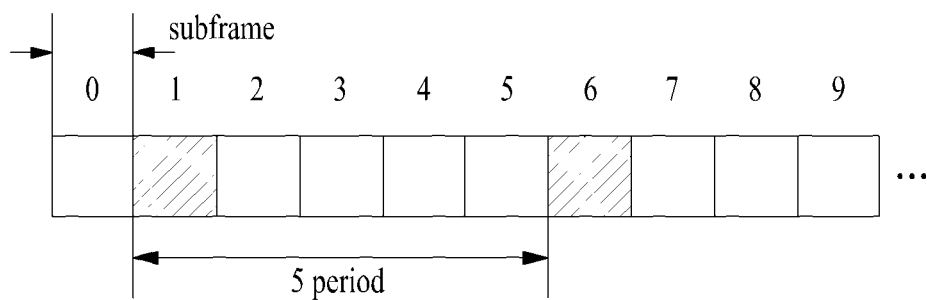
FIG. 6 is a diagram illustrating a channel state information reference signal.
FIGS. 7 to 9 are diagrams illustrating reporting of channel state information.

For a specific CSI-RS according to Equation 2 and Table 1, mapping to REs is performed for each antenna port. FIG. 6 shows mapping of CSI-RSs for each antenna port as described above. In FIG. 6, R0 to R3 respectively represent mapping of CRSs to antenna ports, and the number indications represent mapping of CSI-RSs to antenna ports. For example, REs indicated by numbers 0 and 1 represent mapping of a CSI-RS corresponding to antenna port 0 or 1. In this case, CSI-RSs corresponding to two antenna ports are mapped to the same RE, and may be distinguished by different orthogonal codes.

Next, as described above, the CSI-RS may be transmitted in a specific subframe rather than in every subframe. Specifically, the CSI-RS may refer to CSI-RS subframe configurations as listed in Table 2 given below, and be transmitted in a subframe satisfying Equation 3.

TABLE 2

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ - 5 |
| 15-34 | 20 | $I_{CSI-RS}$ - 15 |
| 35-74 | 40 | $I_{CSI-RS}$ - 35 |
| 75-154 | 80 | $I_{CSI-RS}$ - 75 |

$$(10n_f + \lfloor n_s/2 \rfloor - \Delta_{CSI-RS}) \mod T_{CSI-RS} = 0 \quad \text{Equation 3}$$

In Table 2, $T_{CSI-RS}$ denotes the period for transmission of a CSI-RS, $\Delta_{CSI-RS}$ is an offset value, $n_f$ denotes a system frame number, and $n_s$ denotes a slot number.

The CSI-RS may be signaled to a UE as a CSI-RS configuration information element, as shown in Table 3.

TABLE 3

```
CSI-RS-Config-r10 ::=        SEQUENCE {
    csi-RS-r10                    CHOICE {
        release                       NULL,
        setup                         SEQUENCE {
            antennaPortsCount-r10         ENUMERATED {an1, an2, an4, an8},
            resourceConfig-r10            INTEGER (0..31),
            subframeConfig-r10            INTEGER (0..154),
            p-C-r10                       INTEGER (-8..15)
        }
    }                             OPTIONAL,        -- Need ON
    zeroTxPowerCSI-RS-r10     CHOICE {
        release                       NULL,
        setup                         SEQUENCE {
            zeroTxPowerResourceConfigList-r10  BIT STRING (SIZE (16)),
            zeroTxPowerSubframeConfig-r10      INTEGER (0..154)
        }
    }                             OPTIONAL         -- Need ON
}
```

In Table 3, 'antennaPortsCount' carries the number (selected among 1, 2, 4, and 8) of antennas through which the CSI-RS is transmitted, 'resourceConfig' carries an RE in which the CSI-RS is positioned in an RB in time-resource frequency, and 'subframeConfig' carries a subframe in which the CSI-RS is transmitted and a CSI-RS EPRE value for PDSCH EPRE. Additionally, the eNB delivers information about a zero power CSI-RS.

In CSI-RS Config, 'resourceConfig' indicates the position at which the CSI-RS is transmitted. This parameter indicates accurate positions of a symbol and a carrier in an RB according to CSI-RS configuration numbers of Table 1 represented as 0 to 31.

Channel State Information (CSI) Feedback

MIMO schemes may be classified into an open-loop MIMO scheme and a closed-loop MIMO scheme. In the open-loop MIMO scheme, a MIMO transmitter performs MIMO transmission without receiving CSI feedback from a MIMO receiver. In the closed-loop MIMO scheme, the MIMO transmitter receives CSI feedback from the MIMO receiver and then performs MIMO transmission. In the closed-loop MIMO scheme, each of the transmitter and the receiver may perform beamforming based on CSI to achieve a multiplexing gain of MIMO transmit antennas. To allow the receiver (e.g., a UE) to feed back CSI, the transmitter (e.g., an eNB) may allocate a UL control channel or a UL-SCH to the receiver.

The CSI feedback may include a rank indicator (RI), a precoding matrix index (PMI), and a channel quality indicator (CQI).

The RI is information about a channel rank. The channel rank indicates the maximum number of layers (or streams) that may carry different information in the same time-frequency resources. Since the rank is determined mainly according to long-term fading of a channel, the RI may be fed back in a longer period than the PMI and the CQI.

The PMI is information about a precoding matrix used for transmission of a transmitter and has a value reflecting the spatial characteristics of a channel. Precoding refers to mapping transmission layers to transmit antennas. A layer-antenna mapping relationship may be determined according to a precoding matrix. The PMI is the index of an eNB precoding matrix preferred by the UE based on a metric such as signal-to-interference-plus-noise ratio (SINR), etc. In order to reduce the feedback overhead of precoding information, the transmitter and the receiver may pre-share a codebook including multiple precoding matrices and only an index indicating a specific precoding matrix in the codebook may be fed back.

In a system supporting an extended antenna configuration (e.g. an LTE-A system), additional acquisition of multi-user (MU)-MIMO diversity using an MU-MIMO scheme is considered. In the MU-MIMO scheme, when an eNB performs downlink transmission using CSI fed back by one UE among multiple users, it is necessary to prevent interference with other UEs from occurring because there is an interference channel between UEs multiplexed in the antenna domain. Accordingly, CSI of higher accuracy than CSI in a single-user (SU)-MIMO scheme should be fed back in order to correctly perform MU-MIMO operation.

A new CSI feedback scheme may be adopted by modifying conventional CSI including an RI, a PMI, and a CQI so as to more accurately measure and report CSI. For example, precoding information fed back by the receiver may be indicated by a combination of two PMIs. One of the two PMIs (a first PMI) has a long-term and/or wideband property, and may be referred to as W1. The other PMI (a second PMI) has a short-term and/or subband property, and may be referred to as W2. A final PMI may be determined by a combination (or a function) of W1 and W2. For example, if the final PMI is denoted by W, W=W1*W2 or W=W2*W1.

The CQI is information indicating channel quality or channel strength. The CQI may be expressed as an index corresponding to a predetermined modulation and coding scheme (MCS) combination. That is, a CQI index that is fed back indicates a corresponding modulation scheme and code rate. In general, the CQI has a value reflecting a reception SINR that can be achieved when an eNB configures a spatial channel using a PMI.

The CSI feedback scheme is divided into periodic reporting over a physical uplink control channel (PUCCH) and aperiodic reporting over a PUSCH, which is an uplink data channel, according to a request from an eNB.

In aperiodic reporting, reporting is configured for UEs by a request bit contained in the UL scheduling information of the eNB. Upon receiving this information, each UE sends channel information considering a transmission mode thereof to the eNB over the PUSCH. In the case of periodic reporting, a period of transmission of channel information and a corresponding offset are signaled to each UE in each subframe through a higher layer signal, and the channel information considering a transmission mode of each UE is sent to the eNB over the PUCCH according to a defined period. If data is transmitted on uplink in the subframe in which the channel information is transmitted according to the defined period, the channel information may be transmitted along with the data over the uplink data channel (PUSCH) rather than the PUCCH.

The periodic reporting of channel information is described in more detail below. The periodic reporting is divided into four reporting modes according to CQI and PMI feedback types as shown in Table 4 below.

TABLE 4

|  |  | PMI Feedback Type | |
| --- | --- | --- | --- |
|  |  | No PMI | Single PMI |
| PUCCH CQI Feedback Type | Wideband (wideband CQI) | Mode 1-0 | Mode 1-1 |
|  | UE Selected (subband CQI) | Mode 2-0 | Mode 2-1 |

The periodic reporting is divided into wideband (WB) CQI and subband (SB) CQI according to CQI feedback types, and is divided into No PMI and single PMI according to whether or not PMI is transmitted. Each UE receives information configured by a combination of a transmission period and an offset through RRC signaling in a higher layer. For example, when the UE receives information containing a combination of a period set to '5' and an offset set to '1', the UE transmits channel information in every five subframes as shown in FIG. 7. In this case, the channel information is transmitted over the PUCCH with a subframe offset placed in the direction in which the subframe index increases from subframe #0. Herein the subframe indexes are combinations of a system frame number ($n_f$) and 20 slot indexes ($n_s$; 0 to 19), and thus may be expressed as 10×$n_f$+floor($n_s$/2).

The periodic reporting is divided into one reporting type for transmitting only WB CQI and the other reporting type for transmitting both WB CQI and SB CQI, according to CQI feedback types. In the case of the type for transmitting only the WB CQI, WB CQI information for the entire band is transmitted in subframes corresponding to each CQI transmission period. The transmission period of periodic WB CQI may be set to 2, 5, 10, 16, 20, 32, 40, 64, 80, and 160 ms, or to no transmission. In this case, if PMI needs to be transmitted according to a PMI feedback type in Table 4, PMI information is transmitted together with CQI. In the case of the type for transmitting both WB CQI and SB CQI, WB CQI and SB CQI are alternately transmitted, which will be described with reference to FIG. 8.

Figure 8:
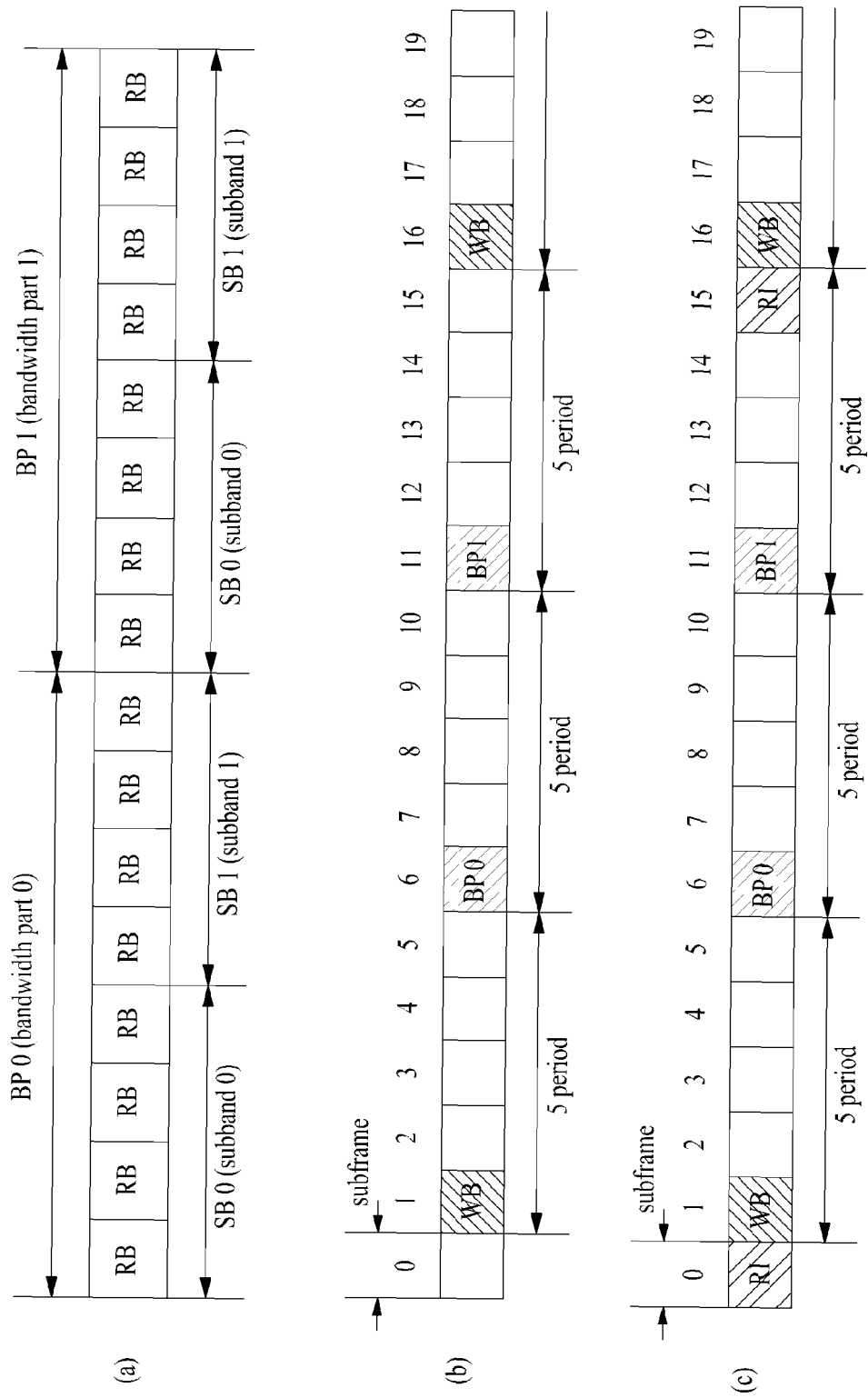

FIG. 8 shows an exemplary system consisting of 16 RBs. The system bandwidth of 16 RBs consists of two bandwidth parts (BPs) (BP0 and BP1), and each BP consists of two subbands (SBs) (SB0 and SB1).

In the case of the type for transmitting both WB CQI and SB CQI, the WB CQI is transmitted in a CQI transmission subframe. In the next transmission subframe, CQI for one SB having a good channel state from among SB0 and SB1 and an index of this SB are transmitted at BP0. In the next transmission subframe, CQI for one SB having a good channel state from among SB0 and SB1 at BP1 and an index of the SB having a good channel state are transmitted. After transmitting the WB CQI, CQI of individual BPs are sequentially transmitted at BP1. In this case, after the WB CQI is transmitted, CQIs for BPs are sequentially transmitted. In this case, the CQIs for BPs located between the WB CQI transmitted and the next WB CQI to be transmitted may be sequentially transmitted one to four times. For example, if the CQI for each BP is transmitted once between two WB CQIs, CQIs are sequentially transmitted in the order of WB CQI, BP0 CQI, BP1 CQI, and WB CQI. In another example, if the CQI about each BP is transmitted four times between the two WB CQIs, CQIs may be transmitted in the order of WB CQI, BP0 CQI, BP1 CQI, BP0 CQI, BP1 CQI, BP0 CQI, BP1 CQI, BP0 CQI, BP1 CQI, and WB CQI. Information about the number of times of sequential transmission is signaled through a higher layer. Regardless of whether the CQI is WB CQI or SB CQI, the information about the number of times of sequential transmission of BP CQI is transmitted over a PUCCH only in a subframe corresponding to the information containing a combination of a period of signaling through the higher layer and an offset. FIG. 8(b) illustrates CQI transmission when information containing a combination of a period set to '5' and an offset set to '1' is signaled to the UE in the case of transmission of both WB CQI and SB CQI. FIG. 8(c) shows RI transmission in addition to CQI transmission of 8(b). In the case of transmission of RI, RI is signaled according to a combination of a transmission period corresponding to a multiple of the WB CQI transmission period and an offset for the transmission period. Herein, the offset is an offset relative to the CQI transmission offset. The offset for RI is defined as 0 or a negative value. For example, if the RI transmission period is one time the WB CQI transmission period, and the offset for RI is '−1', R1 is transmitted in a subframe shown in FIG. 8(c). If the offset for RI is '0' rather than '−1', the transmission subframe of WB CQI overlaps the transmission subframe of RI. In this case, WB CQI is dropped, while RI is transmitted.

In the case of Mode 2-1 in Table 4, two types of periodic reporting may be performed depending on a precoder type indication (PTI) parameter, which is a 1-bit indicator. In this case, W1 and W2 represent the hierarchical codebooks described above. A final precoding matrix W is determined by combining W1 and W2 when W1 and W2 are determined.

More specifically, in the case of Mode 2-1 of periodic reporting, Report 1, Report 2 and Report 3, which correspond to reports of different contents, are transmitted according to different repetition periods. Specifically, in the case of Report 1, RI and a 1-bit PTI value are reported. In the case of Report 2, WB W1 (when PTI=0) or WB W2 and WB CQI (when PTI=1) are reported. In the case of Report 3, WB W2 and WB CQI (when PTI=0), or SB W2 and SB CQI (when PTI=1) are reported.

Report 2 and Report 3 are transmitted in a subframe having an index satisfying $(10 \cdot n_f + \text{floor}(n_s/2) - N_{offset,CQI}) \mod(N_{pd}) = 0$. Herein, $N_{offset,CQI}$ denotes an offset value described above, $N_{pd}$ denotes a subframe interval between Report 2 or Report 3 and neighboring Report 2 or Report 3. Particularly, a subframe whose index satisfies $(10 \cdot n_f + \text{floor}(n_s/2) - N_{offset,CQI}) \mod(H \cdot N_{pd}) = 0$ may be designated as a transmission position of Report 2. In this case, Report 2 is transmitted at every $H \cdot N_{pd}$ interval, and subframes between neighboring Reports 2 are used to transmit Report 3. Herein, $H = J \cdot K + 1$ when PTI=1, and $H = M$ when PTI=0. J is the number of BPs, and K, and M have values determined by higher layer signaling.

Report 1 is transmitted in a subframe whose index satisfies $(10 \cdot n_f + \text{floor}(n_s/2) - N_{offset,CQI} - N_{offset,RI}) \mod(M_{R1} \cdot (J \cdot K + 1) \cdot N_{pd}) = 0$. Herein, $M_{R1}$ has a value determined by higher layer signaling, and $N_{offset,RI}$ corresponds to an offset value of Report 1.

Figure 9:
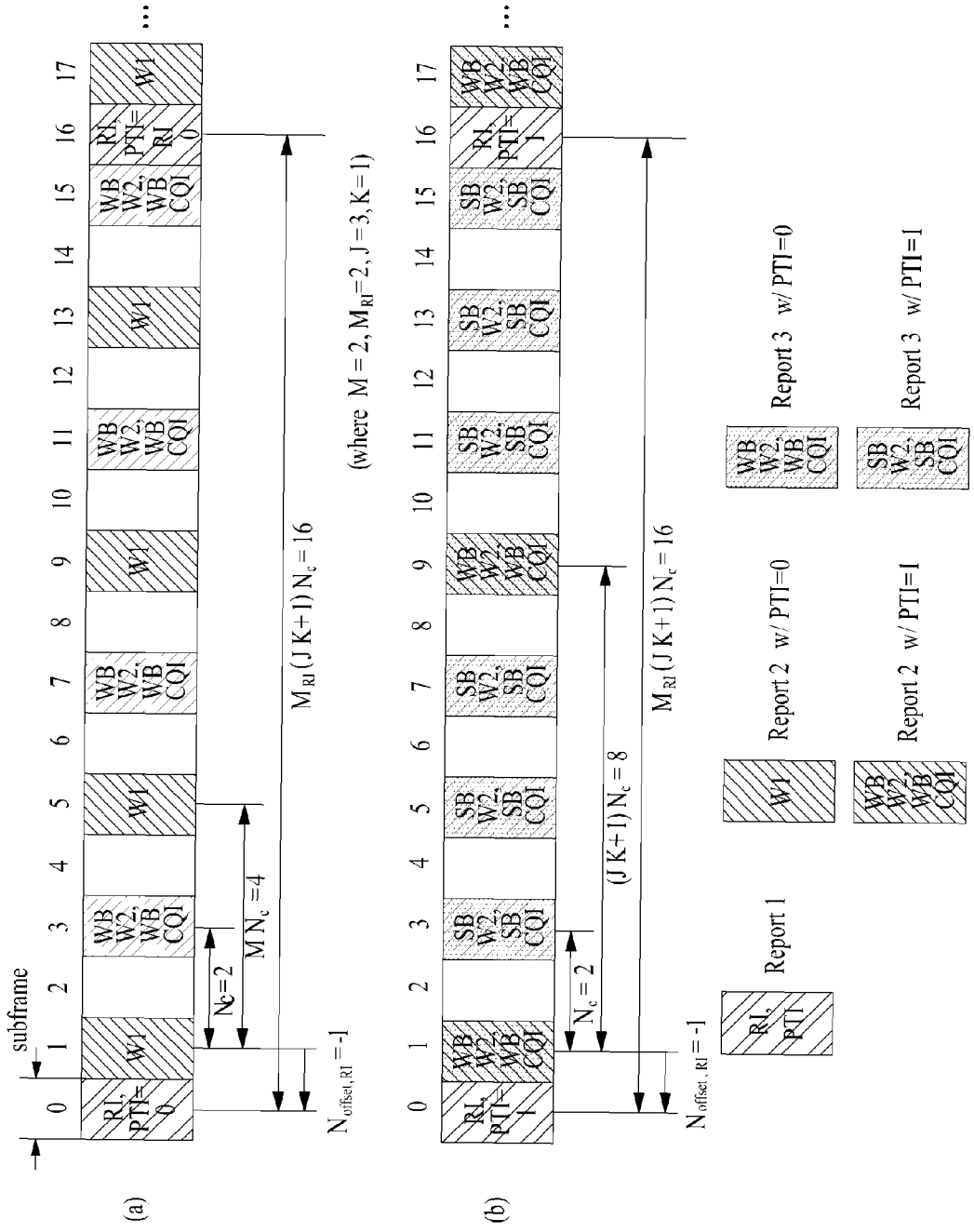

FIG. 9 illustrates two types of periodic reporting according to the aforementioned PTI parameter. Specifically, FIG. 9(a) illustrates a case of PTI=1, and FIG. 9(b) illustrates a case of PTI=0. In FIG. 9, it is assumed that $N_{pd}=2$, $N_{offset,CQI}=1$, M=2, J=3, and K=1. It is also assumed that $M_{RI}=2$, and $N_{offset,RI}=-1$. Thereby, the transmission time of Report 1 does not overlap the transmission time of Report 2. Accordingly, at the time when Report 2 and Report 3 are all transmitted after Report 1 with PTI=0, W1 and W2 are all reported and thus the eNB may recognize final W.

Heterogeneous Deployments

Figure 10:
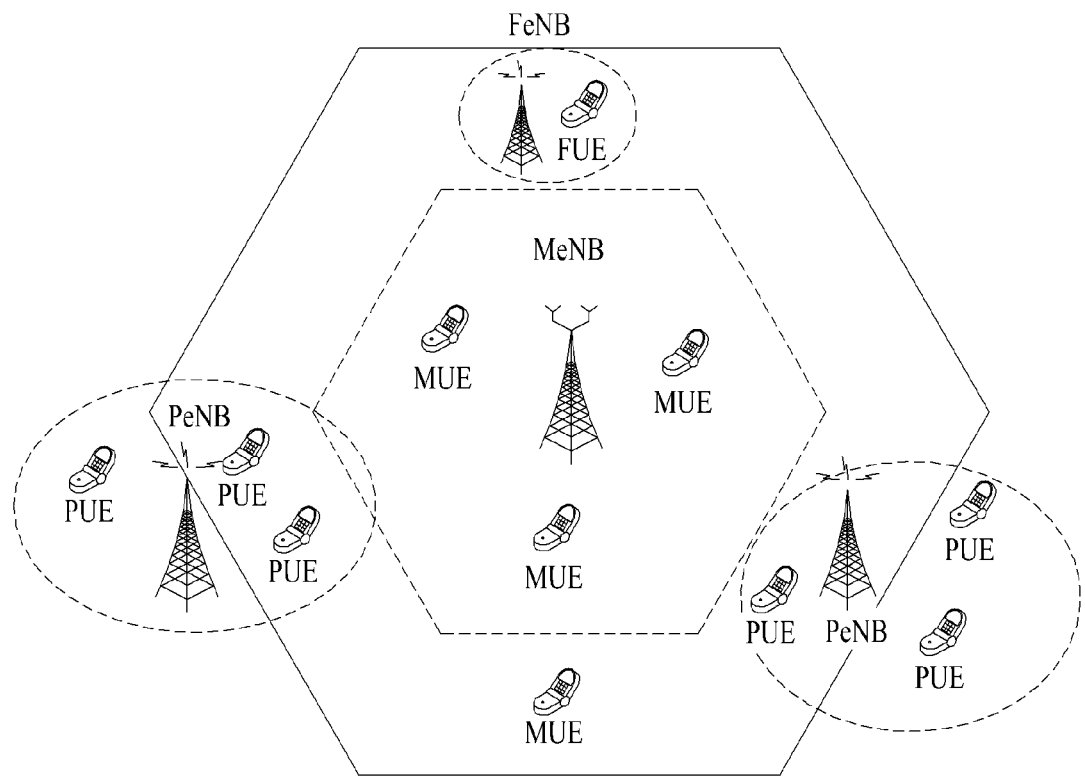
FIG. 10 is a diagram illustrating a heterogeneous network environment.

FIG. 10 illustrates a heterogeneous network wireless communication system including a macro eNB (MeNB) and micro eNBs (PeNBs or FeNBs). The term "heterogeneous network" employed in this specification refers to a network in which an MeNB and a PeNB or FeNB coexist even while they use the same radio access technology (RAT).

The MeNB is a normal eNB of a wireless communication system having wide coverage and high transmission power. The MeNB may be referred to as a macro cell.

The PeNB or FeNB may be referred to as, for example, a micro cell, pico cell, femto cell, home eNB (HeNB), relay, etc. (the exemplified PeNB or FeNB and MeNB may be collectively referred to as transmission points (TPs)). The PeNB or FeNB, a micro version of the MeNB, can independently operate while performing most functions of the MeNB. The PeNB or FeNB is a non-overlay type eNB that may be overlaid in an area covered by the MeNB or in a shadow area that is not covered by the MeNB. The PeNB or FeNB may cover a smaller number of UEs while having a narrower coverage and lower transmission power than the MeNB.

A UE (hereinafter, referred to as a macro-UE (MUE)) may be directly served by the MeNB or a UE (hereinafter, referred to as a micro-UE) may be served by the PeNB or FeNB. In some cases, a PUE present in the coverage of the MeNB may be served by the MeNB.

PeNBs or FeNBs may be classified into two types according to whether UE access is limited.

The first type is an open access subscriber group (OSG) or non-closed access subscriber group (non-CSG) eNB and corresponds to a cell that allows access of the existing MUE or a PUE of a different PeNB. The existing MUE can handover to the OSG type eNB.

The second type is a CSG eNB which does not allow access of the existing MUE or a PUE of a different PeNB. Accordingly, handover to the CSG eNB is impossible.

Coordinated Multi-Point (CoMP)

To satisfy enhanced system performance requirements for the 3GPP LTE-A system, CoMP transmission and reception technology (also called co-MIMO, collaborative MIMO or network MIMO) has been proposed. The CoMP technology may increase the performance of UEs located at a cell edge and the average sector throughput.

In a multi-cell environment with a frequency reuse factor of 1, the performance of a UE located at a cell edge and average sector throughput may be lowered due to inter-cell interference (ICI). To attenuate ICI, the legacy LTE/LTE-A system has adopted a simple passive technique such as fractional frequency reuse (FFR) based on UE-specific power control such that a UE located at a cell edge may have appropriate throughput performance in an environment constrained by interference. However, attenuating the ICI or reusing ICI as a desired signal for the UE may be more desirable than lowering use of frequency resources per cell. To this end, a CoMP transmission technique may be employed.

CoMP schemes applicable to downlink may be broadly classified into joint processing (JP) and coordinated scheduling/beamforming (CS/CB).

According to the JP scheme, data can be used by each transmission point (eNB) of a CoMP cooperation unit. The CoMP cooperation unit refers to a set of eNBs used for a CoMP transmission scheme. The JP scheme may be further divided into joint transmission and dynamic cell selection.

Joint transmission refers to a technique of simultaneously transmitting PDSCHs from a plurality of transmission points (a part or the entirety of a CoMP cooperation unit). That is, a plurality of transmission points may simultaneously transmit data to a single UE. With the joint transmission scheme, the quality of a received signal may be coherently or non-coherently improved, and interference with other UEs may be actively eliminated.

Dynamic cell selection is a technique of transmitting a PDSCH from one transmission point (of a CoMP cooperation unit) at a time. That is, one transmission point transmits data to a single UE at a given time point, while the other transmission points in the CoMP cooperation unit do not transmit data to the UE at the time point. A transmission point to transmit data to a UE may be dynamically selected.

Meanwhile, in the CS/CB scheme, CoMP cooperation units may cooperatively perform beamforming for data transmission to a single UE. While data is transmitted to the UE only from a serving cell, user scheduling/beamforming may be determined through coordination of cells of the CoMP cooperation units.

In the case of uplink, CoMP reception refers to reception of a signal transmitted through cooperation among a plurality of geographically separated transmission points. CoMP schemes applicable to uplink may be classified into joint reception (JR) and coordinated scheduling/beamforming (CS/CB).

The JR scheme indicates that a plurality of reception points receives a signal transmitted through a PUSCH. The CS/CB scheme indicates that only one point receives a PUSCH, and user scheduling/beamforming is determined by coordination of the cells of the CoMP unit.

With a CoMP system as above, multi-cell base stations may jointly support data for a UE. In addition, the base stations may simultaneously support one or more UEs using the same radio frequency resources, thereby increasing system performance. Moreover, a base station may perform space division multiple access (SDMA) based on CSI between the UE and the base station.

In the CoMP system, a serving eNB and one or more cooperative eNBs are connected to a scheduler over a backbone network. The scheduler may receive channel information about the channel states between each UE and cooperative eNBs measured and fed back by the cooperative eNBs over the backbone network, and operate based on the channel information. For example, the scheduler may schedule information for a cooperative MIMO operation for the serving eNB and the one or more cooperative eNBs. That is, the scheduler may directly give each eNB a command to perform the cooperative MIMO operation.

As noted from the above description, it can be said that the CoMP system operates as a virtual MIMO system by grouping a plurality of cells into one group. Basically, the CoMP system may adopt a MIMO communication scheme employing multiple antennas.

FIG. 11 illustrates a CoMP cluster. A CoMP cluster refers to a CoMP cooperation unit mentioned above. FIG. 11(a) illustrates a case in which cells in a CoMP cluster use different physical cell IDs (PCIDs), and FIG. 11(b) illustrates a case in which cells in a CoMP cluster use the same PCID. Even in the case that the cells use the same PCID in a CoMP cluster, the CoMP clusters (CoMP clusters A, B in FIG. 11(b)) may use different PCIDs, and the cells in a single cluster may be configured in the form of a distributed antenna of an eNB or an RRH by sharing a PCID. In a variation, some of the cells in a cluster may share a PCID.

If the cells share the PCID, all the cells having the same PCID may transmit a common signal such as a primary synchronization signal (PSS)/secondary synchronization signal (SSS), a CRS, a PBCH, or a CRS-based PDCCH/PDSCH at the same time. Thereby improving quality of received signals and removing the communication shadow area. Alternatively, some cells having higher transmission power than may transmit a common signal among the cells having the same PCID, and the other cells may not transmit a common signal. However, in the case of unicast data transmission through a CSI-RS, a UE-specific RS and a UE-specific RS-based PDSCH, each cell may individually perform transmission, and have a cell splitting gain.

Hereinafter, description will be given of a CSI-RS transmission scheme proposed in the present invention and a CSI reporting method for a UE using the same, based on the descriptions given above. In the description below, one or more CSI processes per serving cell may be configured for a UE. Specifically, a plurality of CSI processes associated with a channel measurement-related CSI-RS resource configuration and an interference measurement-related CSI-IM (Interference Measurement) resource configuration may be configured for a UE. Herein, a CSI-RS resource configuration may correspond to either a case in which subframes have the same channel characteristics or a case in which subframes have different/variable channel characteristics. The former may be referred to as a periodic CSI-RS, continuous CSI-RS, or fixed beam CSI-RS, and the latter may be referred to as an aperiodic CSI-RS, instantaneous CSI-RS, or adaptive beam CSI-RS. A CSI-IM resource (or interference measurement resource (IMR)) configuration may correspond to either a case in which subframes have the same channel characteristics or a case in which subframes have different/variable channel characteristics. The former may be referred to as a periodic IMR, continuous IMR, fixed beam IMR or fixed property IMR, and the latter may be referred to as an aperiodic IMR, instantaneous IMR, adaptive beam IMR or adaptive property IMR.

As briefly mentioned above, a periodic CSI-RS/IMR and a aperiodic CSI-RS/IMR may be distinguished from each other according to whether subframes have the same channel/interference characteristics or different/variable channel/interference characteristics. The different/variable channel/interference characteristics may mean that an antenna virtualization matrix is not constantly maintained in a subframe corresponding to each configuration in 3D MIMO or massive MIMO.

Hereinafter, 3D MIMO and antenna virtualization matrices related to one embodiment of the present invention will be described with reference to FIG. 12. If the number of transmit antennas increases for 3D MIMO in the pattern of 16 ports, 32 ports, 64 ports, and the like, the number of REs used for CSI-RS transmission for CSI measurement significantly increases, resulting in increase of overhead. For example, when CSI-RSs are transmitted through 64 antenna ports, 64 REs are needed among 168 REs of a subframe, which means 38% of resources are needed for CSI-RS transmission. This is a significant overhead even if it is considered that the CSI-RS is not transmitted in every subframe. Further, when multiple CSI-RS configurations are established in consideration of transmission through cooperation between multiple cells or a zero-power CSI-RS configuration is used for REs on which CSI-RSs of neighboring cells are transmitted, CSI-RS-associated overhead may significantly increase. This problem may be solved by multiple antenna virtualization matrices.

More specifically, CSI-RSs for M ports among N ports may be UE-specifically and aperiodically transmitted, which is a variation of cell-specific and periodic transmission of the CSI-RSs for N ports in resources corresponding to one CSI-RS configuration (Herein, M, which is less than or equal to N, may be differently configured for each UE and vary with time for a specific UE). In other words, in a cell configured with N antenna ports, only M dimensions may be arranged among N dimensions in a manner of UE-dedicated beam and CSI for the same may be fed back, rather than transmitting CSI-RSs for all N dimensions of the spatial domain and receiving feedback of CSI. To this end, M antenna ports may be selected and used among N antenna ports, or mapping between CSI-RSs of N antenna ports and M UE-specific ports or antenna virtualization may be performed using a transform matrix B of N*M dimensions.

Figure 12:
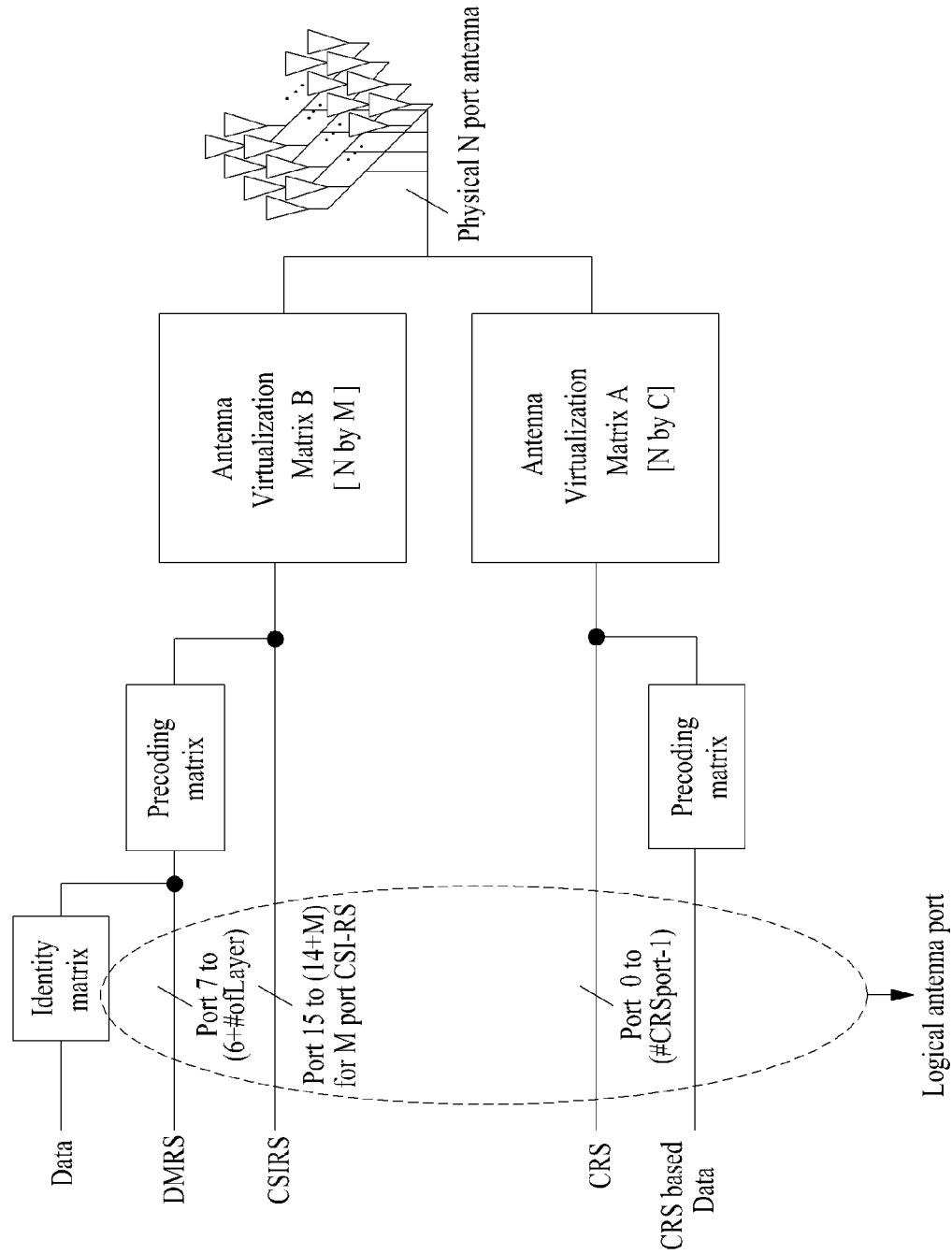
FIG. 12 is a diagram illustrating 3D MIMO and antenna virtualization matrices related to one embodiment of the present invention.

FIG. 12 conceptually shows such antenna virtualization. In FIG. 12, a CSI-RS uses M antenna ports, and the CRS uses C antenna ports. As shown in FIG. 12, N by M antenna virtualization matrix B is used for CSI-RS transmission, the matrix may be designated/configured for each UE. In contrast, antenna virtualization matrix A used for CRS transmission is preferably intended for all UEs. If a signal for CSI-RS antenna ports is $X=\mathrm{diag}(x_1 \, x_2 \ldots x_M)$, a signal after antenna virtualization may be represented as $Z=[z_1 \, z_2 \ldots z_N]=B\cdot X$. Herein, $z_i$ denotes a precoding vector for the i-th CSI-RS antenna port. If the signal for the CRS antenna ports is $Y=\mathrm{diag}(y_1 \, y_2 \ldots y_C)$, a signal after antenna virtualization is $V=[v_1 \, v_2 \ldots v_C]^T=A\cdot Y$. Herein, $V_i$ denotes a precoding vector for the i-th CRS antenna port. Finally, transmit signals of the respective antennas may be transmitted by applying different time delays ($\tau_N$, $\tau_C$) as in Equation 4 below in order to frequency-selectively apply antenna virtualization.

$$Z=[z_1(t-\tau_1) \, z_2(t-\tau_2) \ldots z_N(t-\tau_N)]$$

$$V=[v_1(t-\tau_1) \, v_2(t-\tau_2) \ldots v_C(t-\tau_C)] \quad \text{Equation 4}$$

The antenna virtualization matrix B is preferably configured so as to maximize the energy of the signal received by a corresponding UE, and may vary depending on the location of the UE. Such antenna virtualization matrix B may be found through an uplink SRS (based on reciprocity of downlink and uplink channels). An SRS and previously reported CSI feedback information may be used to trace an optimum antenna virtualization matrix B according to change of location of the UE and change in the channel environment.

If the antenna virtualization matrix is UE-specific, overhead may increase as the number of UEs increases. Accordingly, the antenna virtualization matrix may be UE-group-specifically used. Specifically, for a group of UEs at similar positions, a representative antenna virtualization matrix B may be selected, UEs of the group may be simultaneously informed of transmission of a CSI-RS, and CSI may be fed back.

As an example of a UE-group-specific configuration, in a cell including N antenna ports, antenna ports may be grouped into antenna groups of M antenna ports such that K (K=N/M or K>N/M) antenna groups are configured. The CSI-RS transmission time and period of K antenna group may be determined according to the number of active UEs designated for the corresponding antenna group and the channel change rate for the corresponding UEs. Regarding transmission overhead, if the antenna group does not include any active UE, the eNB may not transmit the CSI-RS of the antenna group. Herein, grouping may be implemented through an N by M transform matrix B as shown in FIG. 12. In other words, antenna virtualization of N antenna ports and the k-th M port antenna group may be performed through a transform matrix $B_k$. Matrix $B_{k1}$ for the k1-th M-port antenna group and matrix $B_{k2}$ for the k2-th M-port antenna group are preferably configured to satisfy Equation 4 below, i.e., to be orthogonal to each other.

$$B_{k1}^T \cdot B_{k2}=0 \quad \text{Equation 4}$$

Subsequently, the eNB may let a specific UE report an average receive signal level, i.e., RSRP for each antenna port group to determine an antenna port group suitable to be allocated to the UE. Specifically, the eNB may configure a CSI-RS management set including multiple periodic CSI-RS transmissions, where the respective CSI-RS in the set represent the antenna port group, such that the UE can report RSRP for multiple CSI-RS configurations.

In summary, in a cell including N antenna ports, antenna ports are groups into K (K=N/M or K>N/M) antenna groups of M antenna ports, one CSI-RS transmission resource is allocated to each antenna group. Alternatively, the number of antenna ports in an antenna group may be individually set for each group. Specifically, the eNB establishes K CSI-RS transmission configurations and assigns an antenna virtualization matrix $B_k$ to each configuration such that a CSI-RS virtualized through a corresponding matrix is transmitted. The eNB may inform the UEs of only some CSI-RS transmission configurations efficient for the UEs among K CSI-RS transmission configurations based on the SRS reception state and an RSRP report.

Figure 13:
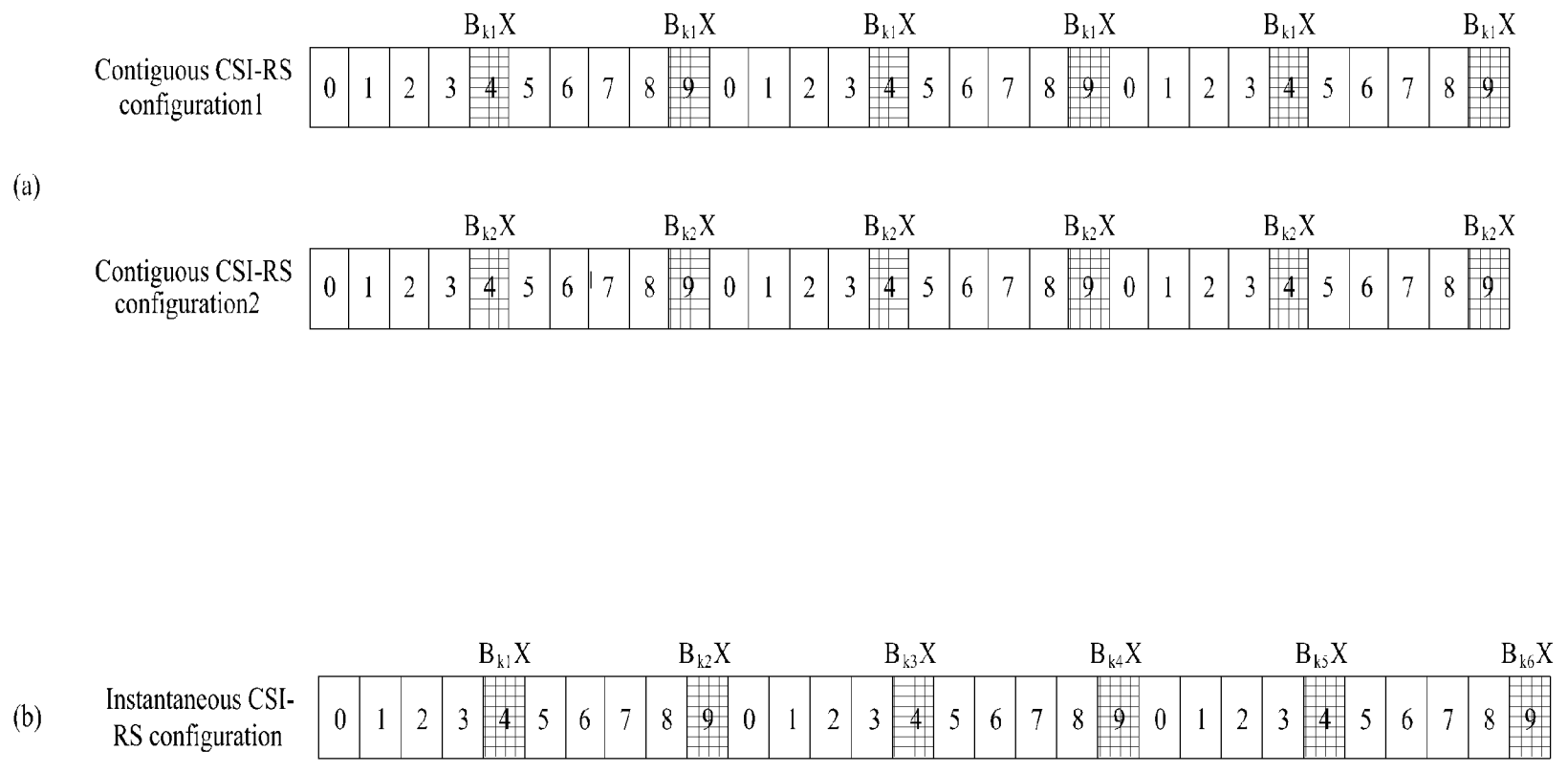

Considering the above description of the periodic CSI-RS/IMR and aperiodic CSI-RS/IMR, the periodic CSI-RS/IMR may mean that the antenna virtualization matrix $B_k$ does not change in the subframes corresponding to the CSI-RS/IMR resource configuration. That is, as shown in FIG. 13(a), $B_{k1}$ for periodic CSI-RS configuration 1 does not change in the subframes corresponding to CSI-RS configuration 1, and $B_{k2}$ for periodic CSI-RS configuration 2 does not change in the subframes corresponding to CSI-RS configuration 2. In addition, the aperiodic CSI-RS/IMR may means that the virtualization matrix $B_k$ changes in subframes corresponding to a resource configuration as shown in FIG. 13(b).

CSI-RS Configuration and Channel Measurement in CSI-RS Resource

Hereinafter, description will be given of a CSI-RS configuration and channel measurement in a CSI-RS resource. In particular, description will be mainly given of an aperiodic CSI-RS configuration (which means that subframes corresponding to a CSI-RS resource configuration according to change of the antenna virtualization matrix have different/variable channel characteristics, as described above).

An eNB may designate a resource region in which a CSI-RS can be transmitted through a cell-specific CSI-RS configuration. In this case, the eNB may be used to inform the UE that the PDSCH is not transmitted in the resource region in which a CSI-RS can be transmitted. The resource region designated through the cell-specific CSI-RS configuration may be divided and used for non-zero power CSI-RS transmission for CSI measurement, for a zero-power CSI-RS configured so as not to interfere with a CSI-RS of a neighboring cell, and/or as an IMR for interference measurement. A cell-specific CSI-RS configuration may include parameters such as subframeConfig, ResourceConfigList, zeroTxPowerResourceConfigList, and zeroTxPowerSubframeConfig. The parameter subframeConfig may indicate a subframe period and a offset by which the CSI-RS is transmitted, and the parameter ResourceConfigList may indicate, through a k-bit bitmap, whether or not k resource regions allowing for transmission of x port CSI-RS in a subframe are configured as cell-specific CSI-RS resources.

Figure 14:
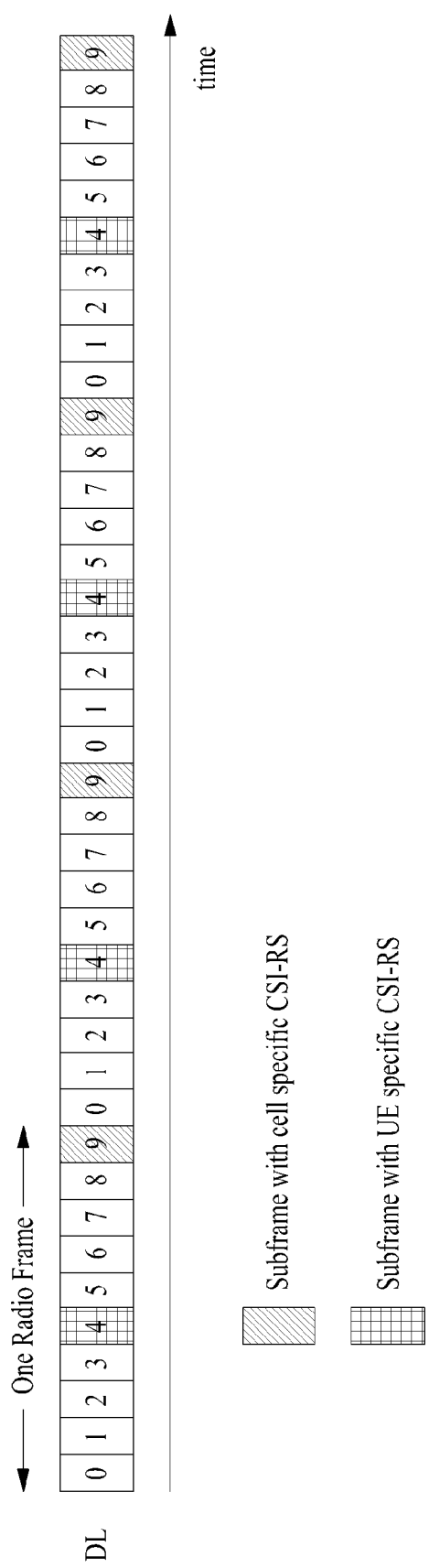
FIG. 14 is a diagram illustrating a cell-specific CSI-RS and a UE-specific CSI-RS according to one embodiment of the present invention.

Additionally, the eNB may designate, through one or more UE-specific aperiodic CSI-RS configurations, a CSI-RS transmission-enabled region for the UE. Herein, a UE-specific aperiodic CSI-RS transmission resource may be a subset of a cell-specific CSI-RS resource, as shown in FIG. 14. If the UE-specific aperiodic CSI-RS is not a subset of a cell-specific CSI-RS, the UE may determine that this is an RRC signaling error, and ignore the UE-specific aperiodic CSI-RS configuration or assume that the PDSCH is not mapped to the UE-specific aperiodic CSI-RS resource. The UE-specific aperiodic CSI-RS configuration may include parameters antennaPortsCount, subframeConfig, resourceConfig, and p-C. The parameter antennaPortsCount defines the number of antenna ports configured for the corresponding UE, the parameter subframeConfig defines a subframe period and an offset by which the CSI-RS is transmitted, the parameter resourceConfig indicates the position of a CSI-RS transmission RE in a subframe, and the parameter p-C indicates a ratio between the PDSCH transmit power and the CSI-RS transmit power.

When the eNB transmits CSI-RS according to cell-specific/UE-specific CSI-RS configurations, channel measurement for corresponding CSI reporting of the UE may be performed as follows.

Figure 15:
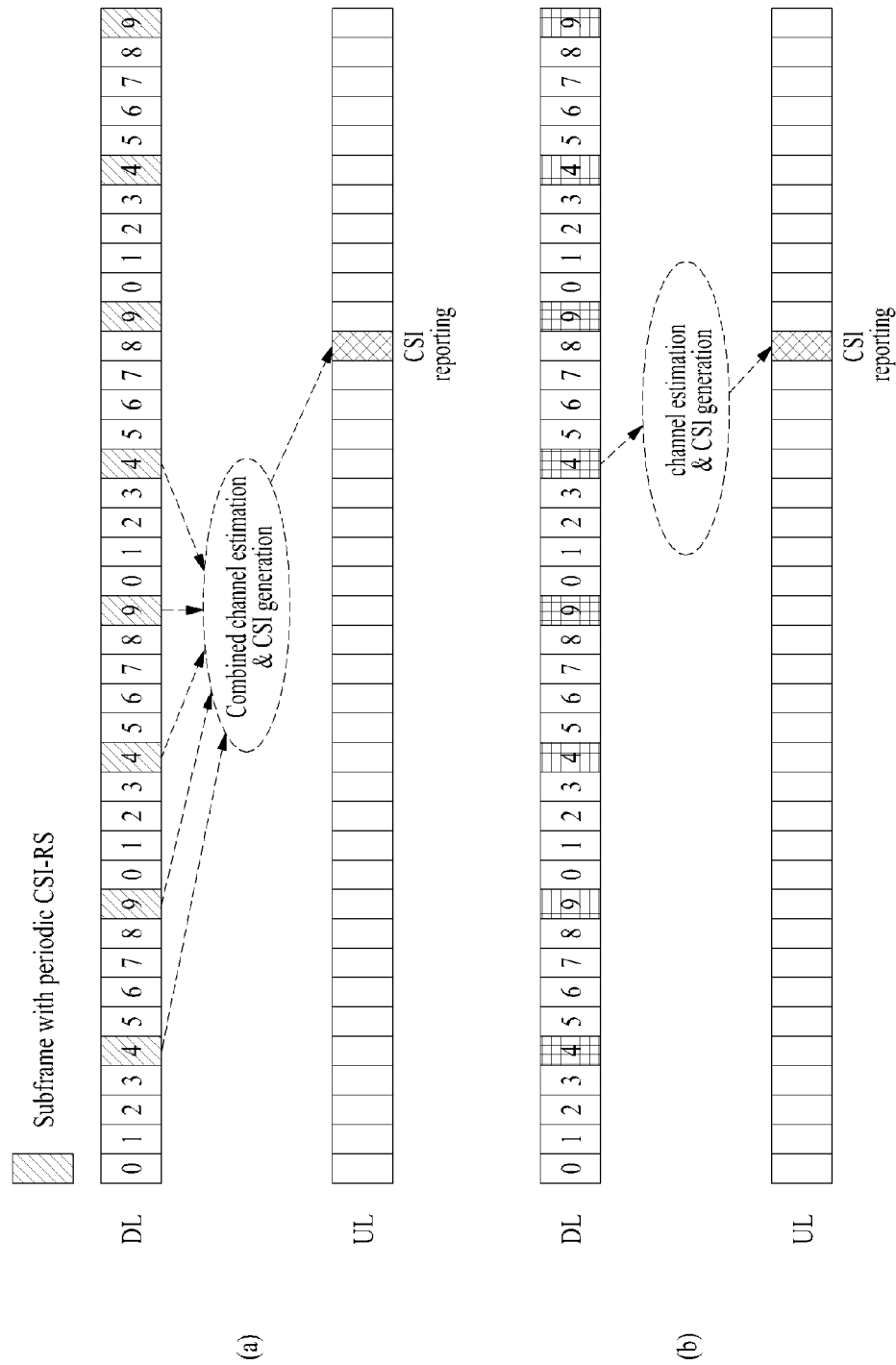
FIGS. 15 and 16 illustrate channel measurement according to one embodiment of the present invention.

In the case of a UE-specific aperiodic CSI-RS configuration, the CSI-RS is not necessarily transmitted through a subframe in which transmission of the CSI-RS is enabled. Further, even if the CSI-RS is transmitted through contiguous subframes, the subframes may have different antenna virtualization matrices of the CSI-RS for the UE. Accordingly, interpolation of the CSI-RS is not performed over contiguous CSI-RS transmission subframes in the process of channel estimation. In other words, in the case of a UE-specific aperiodic CSI-RS configuration, channel estimation may be performed only in a corresponding CSI-RS transmission subframe. Referring to FIG. 15, in the case of a cell-specific CSI-RS configuration, the UE uses, in performing channel measurement, CSI-RS in subframes prior to the subframe in which CSI reporting is to be performed, as shown in FIG. 15(a). In the case of a UE-specific aperiodic CSI-RS configuration, on the other hand, the UE uses, in performing channel measurement, only the CSI-RS in a subframe immediately before the subframe in which CSI reporting is to be performed, as shown in FIG. 15(b). To this end, when the eNB delivers a CSI-RS configuration to the UE, it may also inform of whether the configuration is a periodic configuration or an aperiodic configuration. Alternatively, when the eNB delivers a CSI-RS configuration or a CSI reporting configuration to the UE, it may also inform the UE of whether or not channel estimation results from multiple CSI-RS transmission subframes can be combined for generation of CSI. More specifically, the eNB may inform the UE of the number of previous CSI-RS transmission subframes providing channel estimation results which can be combined for generation of CSI. Herein, the number of CSI-RS transmission subframes which can be used for CSI generation may be defined as a CSI measurement window. If the CSI measurement window is 1, the UE can use only the channel estimation result from a single CSI-RS transmission subframe to perform CSI generation.

In summary, the UE combines, when assigned a periodic CSI-RS, channel estimation results from multiple CSI-RS transmission subframes to generate CSI, while the UE generates, when assigned an aperiodic CSI-RS, CSI in each individual CSI-RS transmission subframe.

Figure 16:
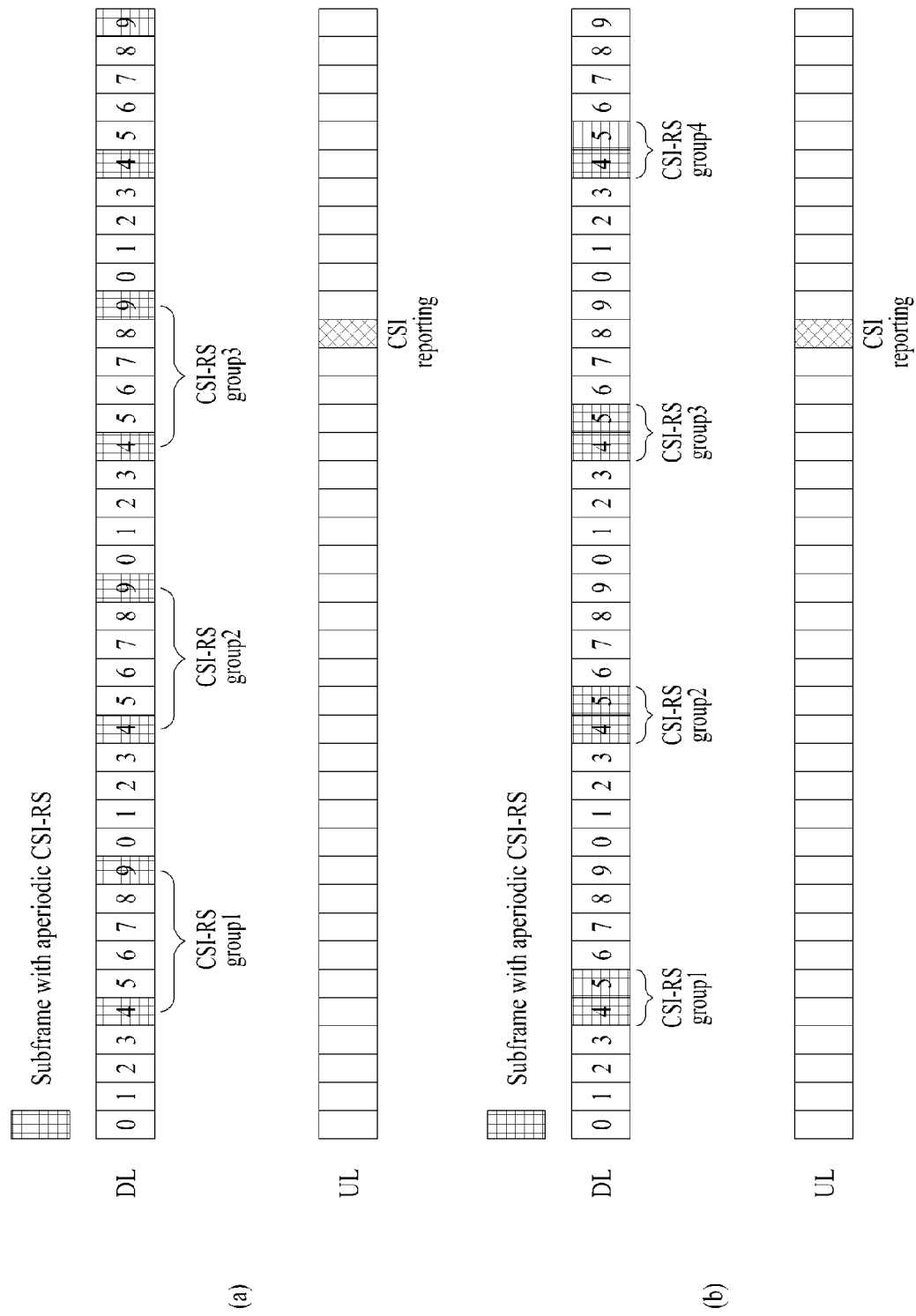

As another example of channel measurement for CSI reporting from the UE, multi-shot/M-shot aperiodic CSI-RS transmission may be considered. Herein, M-shot may refer to the number of CSI-RSs transmitted with the same channel characteristics in transmitting aperiodic CSI-RSs. Alternatively, it may mean that an antenna virtualization matrix is maintained in M subframes. For example, for 2-shot aperiodic CSI-RS transmission, the UE perform channel measurement using CSI-RSs transmitted in two subframes prior to the subframe in which CSI reporting is to be performed. Herein, the two subframes needs to be subframes included in the aperiodic CSI-RS configuration. Hereinafter, description will be given of channel measurement in the case of M-shot aperiodic CSI-RS transmission with reference to FIG. 16. FIG. 16 illustrates an example of 2-shot aperiodic CSI-RS transmission. Specifically, FIG. 16(a) illustrates a case where subframes in which an antenna virtualization matrix is maintained are spaced a certain offset from each other, and FIG. 16(b) illustrates a case where subframes in which an antenna virtualization matrix is maintained neighbor each other. In the case of FIG. 16(a), the eNB needs to inform of an offset value in addition to the value of M and the starting position of a CSI-RS group, compared to the case of FIG. 16(b). In FIG. 16(a), the UE may use the CSI-RS of the 24th subframe to determine the CSI reported in the 28th subframe. However, since the UE has not recognized all the CSI-RSs belonging to CSI-RS group 3, accuracy of CSI estimation becomes low. Accordingly, in order for the UE to determine the CSI reported in the 28th subframe, the UE may use CSI-RSs of the 14th and 19th subframes, which belong to the CSI-RS group 2, to estimate the CSI. Specifically, the CSI information that is fed back when the UE feeds back an aperiodic CSI report over the PUSCH at time n is based on an aperiodic CSI-RS of the UE-specific aperiodic CSI-RS transmission subframe that is recently received at or before time (n−k2) and the CSI-RSs in the CSI-RS group to which the received CSI-RS belongs. Alternatively, the CSI information that is fed back when the UE feeds back an aperiodic CSI report over the PUSCH at time n may be based on all the aperiodic CSI-RS in a CSI-RS group for which reception has been recently completed at or before (n−k2). The eNB may designate a method that is to be used between these two methods.

For CSI which is based on a measured channel as described above, a scheme of periodic reporting over the PUCCH or a scheme of aperiodic reporting over the PUSCH may be used. A periodic CSI-RS transmission configuration for periodic CSI reporting over the PUCCH and an aperiodic CSI-RS transmission configuration for aperiodic CSI reporting over the PUSCH may be individually set for the UE by the eNB. In this case, the CSI for periodic CSI reporting may be based on combined channel estimation, and the CSI for aperiodic CSI reporting may be based on a result estimated in a specific subframe.

Alternatively, channel estimation for periodic CSI reporting over the PUCCH may be performed based on CRSs, and channel estimation for aperiodic CSI reporting over the PUSCH may be based on CSI-RSs which are aperiodically transmitted. In this case, the eNB may determine an MCS of a CRS-based PDSCH/PDCCH for the UE through periodic CSI reporting over the PUCCH.

As the eNB informs the UE of multiple CSI-RS transmission configurations, it may inform the UE of whether each CSI-RS transmission configuration is a periodic configuration or an aperiodic configuration. A Periodic CSI-RS transmission configuration may be used for both periodic CSI reporting over the PUCCH and aperiodic CSI reporting over the PUSCH, and an aperiodic CSI-RS transmission configuration may be used only for aperiodic CSI reporting over the PUSCH. In other words, the eNB ensures that a CSI-RS for channel measurement becomes a periodic CSI-RS transmission configuration, in configuring the scheme of periodic CSI reporting over the PUCCH.

The eNB may deliver multiple CSI-RS transmission configurations to the UE and designate a CSI measurement window for each CSI-RS transmission configuration. A CSI-RS transmission configuration having a CSI measurement window greater than 1 may be used for both the scheme of periodic CSI reporting over the PUCCH and the scheme of aperiodic CSI reporting over the PUSCH, and a CSI-RS transmission configuration having a measurement window equal to 1 may be used only for the scheme of aperiodic CSI reporting over the PUSCH. In other words, the eNB ensures that a CSI-RS for channel measurement has a CSI measurement window greater than 1 in configuring the scheme of periodic CSI reporting over the PUCCH.

Meanwhile, since a PDSCH is not mapped to a resources designated as a cell-specific CSI-RS configuration, the size of the cell-specific CSI-RS resource may be variably managed depending on the number of CSI-RS transmissions which is determined according to the number of active UEs, positions and distribution of the UEs, and a channel change rate. Specifically, the size of the cell-specific CSI-RS resource may be increased when the number of aperiodic CSI-RS transmissions increase, and may be reduced when the number of aperiodic CSI-RS transmissions decreases. To change the size of the cell-specific CSI-RS resource, the cell-specific CSI-RS configuration needs to be re-set. In this case, RRC signaling overhead and/or delay occurs. To make up for this, the eNB may pre-inform of a position where an aperiodic CSI-RS can be transmitted through the cell-specific CSI-RS configuration, and dynamically indicate, over the PDCCH, whether a CSI-RS is transmitted or a PDSCH is transmitted at the position.

More specifically, in the case in which the eNB designate a cell-specific aperiodic CSI-RS configuration and a UE-specific aperiodic CSI-RS configuration and inform the UE of the same, the eNB make it sure that the resource of the UE-specific aperiodic CSI-RS configuration becomes a subset of the resource of the cell-specific aperiodic CSI-RS configuration. The UE is informed, through a 'CSI-RS exist field' of the DCI, whether or not a CSI-RS and a PDSCH are transmitted together in a corresponding subframe. Specifically, if the CSI-RS is transmitted, the UE is informed that the PDSCH is not transmitted in an RE designated for the cell-specific aperiodic CSI-RS configuration. In a CSI-RS transmission-available subframe indicated through the cell-specific aperiodic CSI-RS configuration, positions of REs where CSI-RS transmission is allowed may be designated by a unit of X REs up to Z, and Z bits may be allocated to the 'CSI-RS exist field' of the DCI to inform of whether or not REs are used for CSI-RS transmission or PDSCH transmission for every X REs.

For a CSI-RS transmission-available subframe indicated through the cell-specific aperiodic CSI-RS configuration, the 'CSI-RS exist field' may be added to the DCI. For a subframe in which CSI-RS transmission is not allowed, the 'CSI-RS exist field' may be omitted from the DCI. In other words, the length of DCI transmitted in a CSI-RS transmission-available subframe indicated through the cell-specific aperiodic CSI-RS configuration and a subframe that is not indicated through the cell-specific aperiodic CSI-RS configuration may be different depending on whether or not the 'CSI-RS exist field' is present.

When the DCI is transmitted over the ePDCCH, there is a possibility of collision between the DCI transmission and CSI-RS transmission. Accordingly, when the ePDCCH is received in the CSI-RS transmission-available subframe indicated through the cell-specific aperiodic CSI-RS configuration, it may be assumed/expected/set that the ePDCCH is never mapped to the CSI-RS transmission-available region. However, in the case which the PDSCH is received through the DCI delivered over the ePDCCH, whether or not the PDSCH is mapped to the CSI-RS transmission-available region is determined through the 'CSI-RS exist field' of the DCI.

As another example, only an aperiodic CSI-RS configuration may be designated for the UE without dividing the configurations into a cell-specific aperiodic CSI-RS configuration and a UE-specific aperiodic CSI-RS configuration. This corresponds to a case in which a resource having the cell-specific aperiodic CSI-RS configuration is identical to a resource having the UE-specific aperiodic CSI-RS configuration. In this case, only an aperiodic CSI-RS configuration is designated for the UE, and whether or not CSI-RS transmission is performed in the resource is determined through the DCI and the uplink DCI. Whether to transmit a CSI-RS or a PDSCH on a resource corresponding to the subframe designated for transmission of an aperiodic CSI-RS through the aperiodic CSI-RS configuration is indicated through a specific indicator of the DCI. If the CSI-RS is transmitted on the resource, whether to measure and report the CSI is indicated through the uplink DCI.

In the description above, multiple UE-specific aperiodic CSI-RS configurations may be set for the UE. In this case, the number of antenna ports for each of the configurations may be differently set. This is intended to allow the UE to use a different number of antenna ports to perform aperiodic CSI reporting depending on the time. The antenna virtualization matrix B needs to be properly changed according to change in the location of the UE and the surrounding environment. Specifically, it is advantageous to reduce the number of ports for the UE-specific CSI-RSs corresponding to the number of columns of matrix B to lower overhead when the location of the UE is correctly confirmed and to receive feedback of CSI by increasing the number of ports for the UE-specific CSI-RSs when the location of the UE is not accurate or a high rank needs to be supported.

Each of the multiple CSI-RS configurations allocated to the UE indicates whether the corresponding CSI-RS is a periodic CSI-RS or an aperiodic CSI-RS. The configured transmission resources for the periodic CSI-RSs should serve as unique resources rather than overlapping other CSI-RS transmission resourced. On the other hand, the aperiodic CSI-RSs may share transmission resources. For example, transmission resources for 4-port aperiodic CSI-RSs may be configured to be a part of 8-port aperiodic CSI-RS transmission resources. In other words, the eNB uses half of the 8-port aperiodic CSI-RS transmission resources to transmit 4-port aperiodic CSI-RSs to the UE.

When multiple aperiodic CSI-RS configurations are allocated to the UE, CSI reporting modes for the CSI-RS configurations are individually designated. Herein, the CSI reporting modes may include a wideband reporting mode, a subband reporting mode, a UE-selective reporting mode. This is intended to allow the UE to alternately use the wideband reporting mode and the subband reporting mode according to a situation to perform aperiodic CSI reporting. The eNB may select an approximate beam direction by making a request for wideband CSI reporting to the UE, and then transmit a CSI-RS in the beam direction and make a request for subband CSI reporting.

As described above, multiple CSI-RS configurations including aperiodic CSI-RS configurations and periodic CSI-RS configurations may be allocated to the UE. Alternatively, multiple CSI-RS configurations may be assigned to the UE and the UE may be informed whether each CSI-RS configuration is for periodic CSI-RS transmission or for aperiodic CSI-RS transmission. In the case of setting multiple aperiodic CSI-RS configurations, configuration parameters such as antennaPortsCount, resourceConfig, subframeConfig and p-C may be independently set for each aperiodic CSI-RS configuration. When multiple aperiodic CSI-RS configurations are allocated to the UE, the 'CSI request field' included in the uplink DCI for requesting aperiodic CSI reporting may be constructed with multiple bits to indicate a CSI-RS configuration for which CSI reporting is requested. Alternatively, the eNB may designate multiple aperiodic CSI-RS configurations such that each configuration designates a different subframe as a CSI-RS transmission-available subframe, and the UE may conform to the number of antenna ports for a configuration to which a UE-specific CSI-RS recently received at or before time n belongs, with respect to 'CSI request' of subframe time n. As another method supporting this scheme, a single aperiodic CSI-RS configuration may be divided into multiple subframe sets and designate the number of antenna ports for each of the subframe sets.

CSI-IM (IMR) Resource and Interference Measurement in IMR Configuration

One or more IMRs may be configured for the UE together with or independently of the CSI-RS resource configurations described above, and the eNB may inform the UE of the IMRs through an IMR resource configuration/an IMR configuration. IMRs may include a periodic IMR and an aperiodic IMR, similar to the case of CSI-RSs described above. Hereinafter, description will be given of elements of an IMR configuration, and an aperiodic IMR configuration and interference measurement according to one embodiment of the present invention.

An IMR configuration may include parameters subframeConfig and resourceConfig. The parameter subframeConfig defines the period and offset of subframes in which interference measurement resources are configured, and the parameter resourceConfig indicates the position of an interference measurement RE in a subframe. When the UE is assigned IMR configurations for CSI reporting, the UE uses only designated IMRs to perform interference measurement, considering signals received on the resources indicated by an IMR configuration as interference.

Periodic IMR configuration means that an interference environment is uniform among the subframe according to the IMR configuration, and aperiodic IMR configuration means that the subframes according to the IMR configuration have different interference environments. Accordingly, in the case of the periodic IMR configuration, the UE may measure and combine/average interferences over contiguous IMR configuration subframes. In the case of the aperiodic IMR, the subframes may have different interference characteristics, and thus the interference measured in a subframe closest to a subframe for performing CSI reporting measurement may be used for CQI reporting.

Alternatively, the eNB may directly inform the UE of whether interference estimation results from multiple previous IMR transmission subframes can be combined for interference estimation or only the interference estimation result from a recent IMR transmission subframe should be used, when the eNB delivers an IMR configuration to the UE. The eNB may also inform the UE of the number of recent IMR transmission subframes providing interference estimation results to be combined. In this case, the number of indicated subframes may be referred to as an interference measurement window.

An eNB performing MU-MIMO scheduling may use an aperiodic IMR to accurately receive CSI from MU-MIMO-paired UEs. A detailed description will be given below with reference to FIG. 17. In general, an eNB is configured to configure a periodic IMR for the UEs and the UEs are configured to report CSI about the SU-MIMO state. The eNB determines UEs to be subject to be MU-MIMO-paired based on the SU-MIMO CSI that is fed back. However, since the fed-back PMI indicating a channel direction is selected from a restricted codebook in consideration of feedback overhead, the channel direction may not be accurately indicated. Accordingly, selection of transmission precoding matrix and/or AMC for a transmission data of the UEs selected in MU-MIMO scheduling may not be optimized. To improve this situation, the eNB may configure an aperiodic IMR for UEs, and transmit designated signals to the MU-MIMO-paired UEs on the IMR in a specific subframe such that CQI and CSI to be used later in MU-MIMO scheduling are reported.

For example, referring to FIG. 17, the eNB may determine to apply MU-MIMO pairing to UE 1 and UE 2 and receive CSI from the UEs. In this case, the eNB may transmit a signal for UE 2 that is MU-MIMO paired on an RE of the third subframe which is the IMR of UE 1. Herein, the signal for UE 2 may be PDSCH for UE 2 or a dummy data signal subjected to a PMI to be used for later transmission to UE 2. UE 1 may measure each channel and interference through the CSI-RS and IMR of the third subframe, calculate CSI based on the same, and then perform CSI reporting in the eighth subframe. Similarly, the eNB may transmit a signal for UE 1 in the IMR for UE 2 (the fourth subframe) and cause corresponding CSI to be reported. Base on such CSI reporting, the eNB may revise transmission AMC and PMI to be used in performing MU-MIMO scheduling of UE 1 and UE 2. After the revision, the eNB may perform an operation for MU-MIMO in the second radio frame as in the first radio frame, as shown in FIG. 17. To correct selection of transmission AMC and PMI in MU-MIMO scheduling, the IMR for CSI measurement intended for MU-MIMO needs to have an interference measurement window set to 1 so as not to perform inter-subframe averaging. To effectively modify the operation described above, the UE is assigned one or more periodic IMRs and one or more aperiodic IMRs, the periodic IMR is used to receive CSI for SU-MIMO, and the aperiodic IMR used to receive CSI for MU-MIMO.

Figure 18:
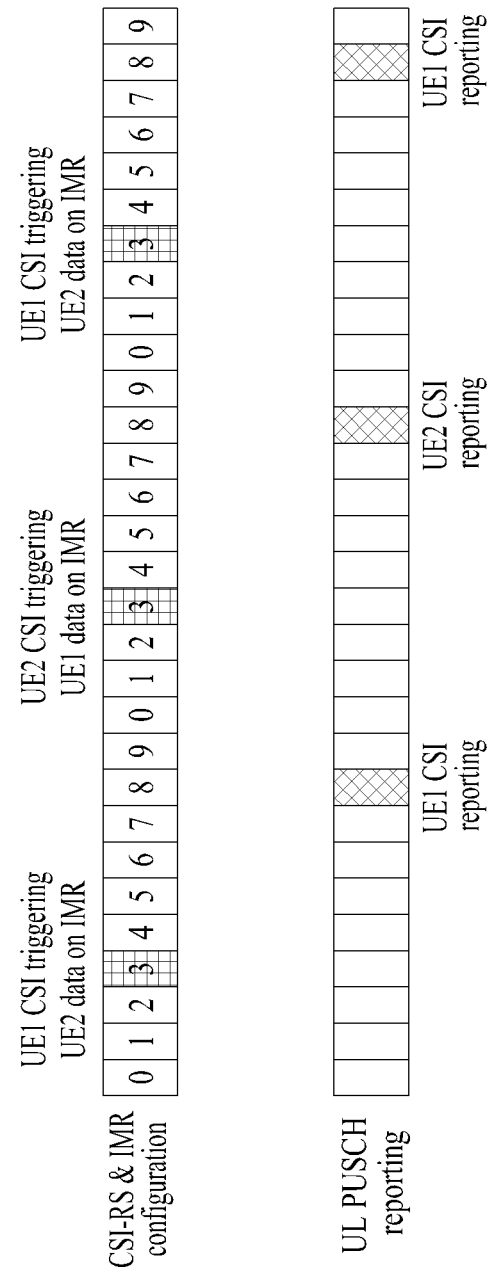

FIG. 18 illustrates a case in which the same IMR configuration is designated for the MU-MIMO paired UEs. Referring to FIG. 18, the eNB may transmit a signal for UE 2 on the IMR of the third subframe and instruct UE 1 to report CSI in the eight subframe using the IMR. Then, the eNB may transmit a signal for UE 1 on the IMR of the thirteenth subframe based on the CSI information and instruct UE 2 to report CSI in the eighteenth subframe using the IMR.

For the aperiodic IMR scheme described above, aperiodic reporting may be more suitable as a CSI feedback method than periodic reporting. Accordingly, the eNB may configure an aperiodic IMR for a specific UE and make a request for CSI feedback to the UE through the 'CSI request field' of the DCI of PDCCH. When the UE receives an aperiodic CSI request over the PDCCH in subframe n, the UE may feed back an aperiodic CSI report over the PUSCH in subframe (n+k). The fed-back CSI information is information measured based on an IMR of a recent subframe configured at or before subframe time n. Alternatively, when the UE receives an aperiodic CSI request over the PDCCH at the time of subframe (n−k1), the UE feeds back an aperiodic CSI report through the PUSCH at time n. The fed-back CSI information is measured based on a recent subframe at or before time (n−k2).

In the case of an aperiodic IMR, an M-shot (multi-shot) aperiodic IMR may be considered as in the case of an aperiodic IMR. In the case of M-shot aperiodic IMRs, the eNB transmits the same interference signal on the IMRs over the M contiguous IMR configuration subframes such that the UE can estimate the same interference. That is, M contiguous IMR configuration subframes are grouped into one. According to an M-shot aperiodic IMR scheme, the eNB additionally informs the UE of the value of M and an offset value of the starting position of the IMR group.

In terms of a multi-shot aperiodic IMR scheme, according to a first method for designating an IMR to be measured, when the UE feeds back an aperiodic CSI report over the PUSCH at time n, the fed-back CSI information is measured based on a recent IMR configuration subframe at or before time (n−k2) and other IMRs in the IMR group to which the IMR belongs. According to a second method, when the UE feeds back an aperiodic CSI report over the PUSCH at time n, the fed-back CSI information is measured based on all the IMRs in a IMR group in which reception has been recently completed at or before time (n−k2). The eNB may designate either the first method or the second method that is to be sued by the UE.

In the M-shot aperiodic IMR scheme, transmission subframes of IMRs belonging to an IMR group may be defined as neighboring subframes. In this case, the eNB informs the UE of an interval of IMR group configurations and the value of M.

CSI Process

Figure 19:
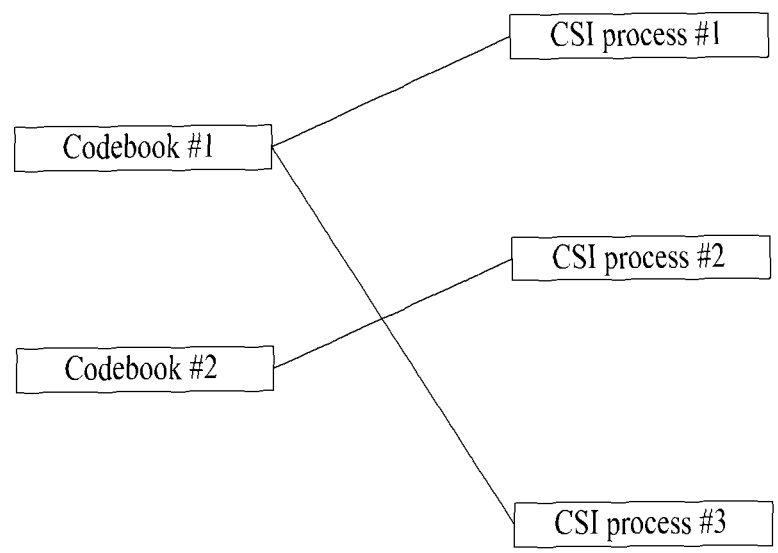
FIG. 19 is a diagram illustrating a relation between codebooks and CSI processes according to one embodiment of the present invention.

A plurality of CSI processes may be configured for a UE, and the UE may determine and report CSI about one of the CSI processes. Herein, the CSI processes may be related to (a combination of) a CSI-RS configuration for channel measurement and a CSI-IM configuration for interference measurement. The CSI-RS configuration may be the periodic CSI-RS configuration or aperiodic CSI-RS configuration described above, and the CSI-IM configuration may also be the periodic or aperiodic CSI-RS configuration described above. The UE may measure a channel based on a CSI-RS resource corresponding to a CSI process, and interference based on a CSI-IM resource corresponding to the CSI process. Then, the UE calculate/determine the CSI (at least one of CQI, PMI and RI) based on the measured channel and interference and report the same over an uplink channel. Herein, a codebook for CSI reporting that is used in determining the CSI may be one of two or more codebooks independently corresponding to multiple CSI processes configured for the UE. For example, referring to FIG. 19, when there are two codebooks (codebooks #1 and #2) and three CSI processes (CSI processes #1, #2 and #3) that reflect different beams/antenna characteristics, the codebooks may be individually designated for the respective CSI processes. More specifically, for example, codebook #1, codebook #2 and codebook #3 may be individually/independently designated/allocated/mapped to CSI process #1, CSI process #2 and CSI process #3. Herein, codebooks #1 and #2 may be pre-configured for different beams/antenna characteristics.

Hereinafter, description will be given of an exemplary case in which codebooks have different beams/characteristics. In a massive MIMO system, in order to fine an antenna virtualization matrix suitable for a specific UE, a CSI-RS of a narrow beam may be transmitted after a CSI-RS of a wide beam is transmitted and thereby the beam directionality is confirmed. Alternatively, if movement of the UE is recognized, a CSI-RS of a wide beam may be transmitted to feed back CSI. Herein, a transmission channel of a CSI-RS virtualized by a matrix having the characteristics of the wide beam may be well represented by a codebook reflecting the characteristics of the wide beam, and a CSI-RS transmission channel virtualized by a matrix having the characteristics of a narrow beam may be well represented by a codebook reflecting the characteristics of the narrow beam. Accordingly, when multiple codebooks are used to well represent multiple channel environments, codebooks to be used for CSI processes configured for the UE are individually designated. Alternatively, codebooks to be used are individually designated for multiple CSI-RS configurations set for the UE. For example, the eNB allocates two CSI-RS configurations to the UE, and designate a different codebook for each of the CSI-RS configurations. The eNB connects codebook #1 reflecting the characteristics of a wide beam to CSI-RS configuration 1 and codebook #2 reflecting the characteristics of a narrow beam to CSI-RS configuration 2 and inform the UE of this information. Then, the eNB transmits a CSI-RS of a wide beam to the UE through CSI-RS configuration 1 and instructs the UE to measure this and report CSI using codebook #1. In contrast, the eNB transmits a CSI-RS of a narrow beam through CSI-RS configuration 2 set for the UE and instructs the UE to measure this and report CSI using codebook #2.

Next, CSI process allocation/configuration for a UE of an eNB will be discussed below.

An eNB may allocate multiple CSI-RS configurations and multiple IMR configurations to the UE and individually indicate whether each configuration is a periodic configuration or an aperiodic configuration. The eNB may allocate multiple CSI-RS configurations and multiple IMR configurations to the UE and inform the UE of the size of a window for measurement of each configuration on a subframe-by-subframe basis. If a CSI measurement window designated for a specific CSI-RS configuration is 1, the UE uses only a channel estimation result from a single CSI-RS transmission subframe to generate CSI. Similarly, if an interference measurement window designated for a specific IMR configuration is 1, the UE uses an estimation result from a single IMR subframe to determine an estimated value of interference (or a correlation between an interference direction and interference).

A specific CSI (reporting) process is generated by designating one CSI-RS configuration for receive signal measurement and one IMR configuration for interference measurement. Both connected CSI-RS configuration and IMR configuration may be aperiodic configurations or periodic configurations. Alternatively, an aperiodic CSI-RS configuration and a periodic IMR configuration may be connected to generate a CSI reporting process. Alternatively, a periodic CSI-RS configuration and a aperiodic IMR configuration may be connected to generate a CSI reporting process.

Table 5 below exemplarily shows four possible types of CSI process according to combinations of whether or not the CSI-RS is periodic/aperiodic and whether or not the IMR is periodic/aperiodic. Only some of these processes may be supported and pre-designated. For example, only the PP CSI process and the AA CSI process may be supported. In the case in which only the PP CSI process and the AA CSI process are supported, the eNB may designate whether each CSI process is of PP type or AA type when it informs the UE of the CSI processes. Alternatively, the eNB may inform the UE of measurement windows for the CSI processes on the subframe-by-subframe basis. In this case, the same value of the measurement window is used for both CSI measurement and interference measurement.

TABLE 5

|  | Periodic IMR (Continuous IMR) | Aperiodic IMR (Instantaneous IMR) |
| --- | --- | --- |
| Periodic CSI-RS (Continuous CSI-RS) | PP CSI process | PA CSI process |
| Aperiodic CSI-RS (Instantaneous CSI-RS) | AP CSI process | AA CSI process |

For the AA CSI process, only a case in which subframe-Config of an aperiodic CSI-RS configuration is identical to subframeConfig of a aperiodic IMR configuration may be supported. In other words, for the AA CSI process, 1IMR is set to be always present in a CSI-RS transmission subframe.

For the AA CSI process, aperiodic reporting is more suitable than periodic reporting as a CSI feedback scheme. Accordingly, the eNB configures aperiodic CSI-RS transmission and an aperiodic IMR for a specific UE and makes a request to the UE for CSI feedback through 'CSI request field' in the DCI of the PDCCH. When the UE receives an aperiodic CSI request over the PDCCH at subframe time n, the UE may feed back an aperiodic CSI report over the PUSCH in time (n+k). The fed-back CSI information is measured based on only an aperiodic CSI-RS recently received and an aperiodic IMR recently configured at or before subframe time n. Alternatively, when the UE receives an aperiodic CSI request over the PDCCH at subframe time (n-k1), the UE feeds back an aperiodic CSI report through the PUSCH at time n. The fed-back CSI information is measured based on only an aperiodic CSI-RS recently received and an aperiodic IMR recently configured at or before subframe time (n-k2).

Table 6 below shows possible combinations of CSI process types and CSI reporting modes. Only some of the combinations may be supported and pre-designated. For example, the AA CSI process may be designated to support only aperiodic PUSCH CSI reporting. The PA CSI process and the AP CSI process may also be designated to support only aperiodic PUSCH CSI reporting. Only some CSI reporting modes may be supportable. For example, the AA CSI process, and the PA CSI process or the AP CSI process may be supported in the wideband reporting mode among the periodic PUCCH CSI reporting modes and may not be supported in the subband reporting mode.

TABLE 6

|  | Periodic PUCCH CSI reporting | Aperiodic PUSCH CSI reporting |
|---|---|---|
| PP CSI process | Possible/Impossible | Possible/Impossible |
| PA CSI process | Possible/Impossible | Possible/Impossible |
| AP CSI process | Possible/Impossible | Possible/Impossible |
| AA CSI process | Possible/Impossible | Possible/Impossible |

Subband Selective CSI-RS/CSI-IM

In a cell including N antenna ports, it takes 5K ms to group antenna ports into K (=N/M or >N/M) antenna groups of M antenna ports and transmit all CSI-RSs corresponding to K antenna groups through an aperiodic CSI-RS configuration which is set at intervals of 5 ms. This is a time taken to transmit each of the CSI-RSs corresponding to all antenna groups suitable for a specific UE once.

For an eNB having 64 antennas, the number of configurations allowing transmission of unique 4-port CSI-RS is 16. Therefore, in a first method to directly check an optimum 4-port CSI-RS in a UE, the eNB may allocate 16 fixed beam CSI-RS configurations to the UE and instruct the UE to select and report a CSI-RS configuration having the best quality. According to a second method, one adaptive beam CSI-RS configuration is set for the UE, the UE selects and reports the optimum CSI-RS transmission time through 16 different 4-port CSI-RS transmissions, and the eNB confirms the antenna groups for the CSI-RSs transmitted at the optimum time. In this case, 80 ms is required to perform 16 CSI-RS transmissions even when the minimum transmission period of CSI-RSs, which is 5 ms, is considered. In brief, the first method results in waste of resources due to configurations of excessive CSI-RS resources, while the second method takes excessive time.

Figure 20:
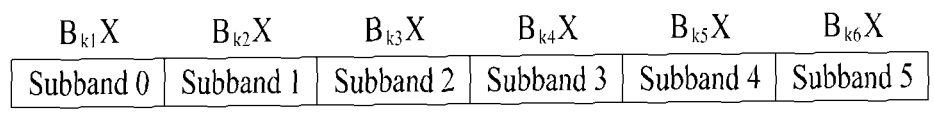
FIG. 20 is a diagram illustrating subband selective CSI-RS transmission according to one embodiment of the present invention.

To address these problems, the present invention proposes that a different transmit antenna group is set for each subband. In other words, in the subband selective CSI-RS transmission scheme, an antenna virtualization matrix for CSI-RS transmission is differently used according to each subband in a CSI-RS transmission subframe. FIG. 20 illustrates a case in which an antenna virtualization matrix is differently applied according to subbands to transmit CSI-RSs.

When an eNB signals designated CSI-RS configurations to a UE, it also signals whether or not the CSI-RS is a subband selective CSI-RS. The size of a subband may be predefined or may be signaled to the UE by the eNB. If the configured CSI-RS is a subband selective CSI-RS, the UE does not perform channel interpolation between different subbands in performing channel estimation through the CSI-RS. Specifically, the UE uses only a CSI-RS received within a specific subband to perform for channel estimation of the specific subband.

Similar to the CSI-RS, an IMR may also be configured to be subband selective. In the case of a subband selective IMR, since there is a significant difference in interference characteristic between subbands, interference measured in different subbands are not averaged, and interference in a subband is measured using only IMRs belonging to the subband. When the eNB delivers IMR configurations to the UE, it signals whether or not the IMR is a subband selective IMR. The size of a subband may be predefined or may be designated and signaled to the UE by the eNB. If the configured IMR is a subband selective IMR, the UE measures interference for a subband using only the IMRs belonging to the subband.

If a CSI-RS or IMR configured for a CSI process is subband selective, the CSI process will be referred to as a subband selective CSI process. The subband selective CSI process may be allowed only when both the CSI-RS and IMR configured for the process are subband selective. As a CSI reporting mode for the subband selective CSI process, the subband CSI reporting mode, in which CSI can be reported according to each subband, is used. This is because a wideband CSI reporting mode allowing only CSI to be reported in the full band is not useful in the case in which subbands have different channel characteristics and interference characteristics. In the subband CSI reporting mode for the subband selective CSI process, RI may be independently selected and reported in each subband. In addition, when PMIs is divided into a long-term PMI and a short-term PMI according to a dual codebook, the long-term PMI and the short-term PMI may be independently selected and reported in each subband in the subband CSI reporting mode for the subband selective CSI process.

In subband CSI reporting mode, CSI about a channel, i.e., RI, PMI and CQI about the channel are independently selected and reported in each subband, and therefore feedback overhead is significantly large. Further, as shown in FIG. 20, some of the antenna virtualization matrices used in the respective subbands have directionality different from that of the channel directionality for the UE, and thus corresponding CSI-RS transmission may be meaningless to the UE. Antenna virtualization matrices used in some subbands may be optimized for the channel directionality of another UE. In other words, the eNB may use a mixture of virtualization matrices of a channel direction for UE 1 and virtualization matrices of a channel direction for UE 2 in a specific subband selective CSI-RS transmission subframe. For this reason, it is not efficient for specific UE to report CSI for all subbands.

To solve this problem, the present invention proposes a UE selective subband CSI reporting mode. In the proposed CSI reporting mode, the UE selects some subbands having high reception qualities among all subbands and independently selects and reports CSI for the selected subband, i.e., RI, PMI and CQI. In the case in which the UE selects K subbands to perform reporting, the value of K may be predefined, or designated when eNB designates a CSI reporting mode for the UE. Herein, the UE does not report channel information about a subband other the selected subband, and determination of CSI to be reported for the selected subband is based on a channel measured using only a CSI-RS transmitted in a subband or interference information using only an IMR configured in the subband.

CSI Process with Restricted CSI Measurement

In a heterogeneous network environment where a macro cell and a pico cell which have different transmits powers of an eNB are present together, the cell region of a pico cell is expanded for load balancing such that the UE receives services from the pico cell and thus overall system capacity increases even if the receive power of a signal transmitted from the pico cell is lower than the receive power of a signal transmitted from a macro cell. When the environment is managed in this way, UEs in a cell range expansion (CRE) region will be served by the pico cell even if the receive power of a signal transmitted from the pico cell is lower than the receive power of a signal transmitted from a macro cell. Accordingly, the macro cell is referred to as an aggressor cell and the pico cell is referred to as a victim cell.

In this case, as a method for interference coordination, inter-cell interference coordination (ICIC) may be implemented in a manner that the aggressor cell uses silent subframe (almost blank subframe (ABS)) reducing transmit powers/activities of some physical channels (including setting a configuration with zero-power), and the victim cell schedules the UE in consideration of the silent subframe. In this case, the interference level significantly varies with subframes on the side of the victim cell UE. To perform more accurate radio link monitoring (RLM) or radio resource management (RRM) of measuring RSRP/RSRQ in each subframe or measure CSI for link adaption in this situation, the monitoring/measurement needs to be confined to sets of subframes having uniform interference.

In the CSI reporting process, the eNB configures subframe sets 0 and 1 for the UE to perform restricted CSI measurement. Subframe sets 0 and 1 are disjointed from each other, an not all of subframe sets 0 and 1 include a subframe. When such restricted measurement is configured, the UE selects and reports CSI0 (RI, PMI and CQI) measured in subframe set 0 and CSI1 (RI, PMI and CQI) measured in subframe set 1 at a designated moment.

When the CSI reporting process includes a CSI-RS configuration for receive signal measurement and an IMR configuration for interference measurement, the UE performs restricted CSI measurement to determine CSI to report. The UE determines CSI0 based on interference measured using only IMR subframes belonging to subframe set 0, and CSI1 based on interference measured using only IMR subframes belonging to subframe set 1.

Figure 21:
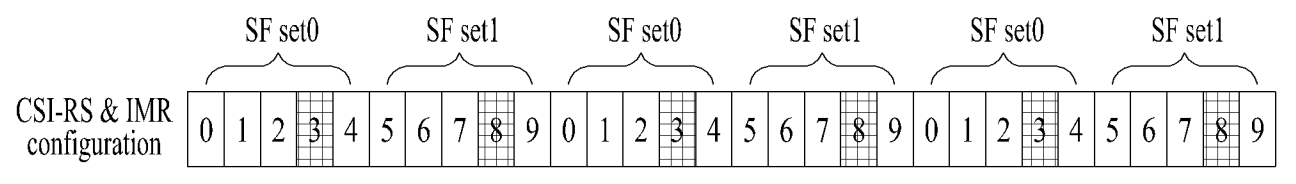

When an IMR is configured every 5 subframes as shown in FIG. 21, CSI to be reported is determined in a manner that CSI0 is determined based on interference measured using the IMRs of the third, thirteenth, twenty-third subframes and CSI1 is determined based on interference measured using the IMRs of the eighth, eighteenth, and twenty-eighth subframes.

Regarding the time domain ICIC of a heterogeneous network environment, properties of interference changes among the subframe sets, but characteristics of a signal to be measured do not change among the subframe set. Therefore, even if subframe sets are configured, measurable CSI-RS transmission subframes are not restricted. That is, when a CSI-RS is configured every 5 subframes as shown in FIG. 21, CSI to report between CSI0 and CSI1 is determined based on a signal measured using the CSI-RSs of all subframes.

In order to shown various beam directions in an application field such as massive MIMO to which subframe sets are applied, the eNB may configure different beam directions of CSI-RSs according to subframe sets. In this case, signal measurements of the UE need to be differentiated from each other according to subframe sets. In other words, when a CSI-RS is configured every 5 subframes as shown in FIG. 21, CSI0 is determined to be reported based on a signal measured using the CSI-RSs of the third, thirteenth and twenty-third subframes, and CSI1 is determined to be reported based on a signal measured using the CSI-RSs of the eighth, eighteenth and twenty-eighth subframes.

Since the purpose of configuration of subframe sets varies, the eNB determine whether transmit signals of the subframe sets have the same/different characteristics and whether the subframe sets have the same/different interference characteristics and signals the same to the UE.

If the UE is informed that the characteristics of transmit signals are the same between the subframe sets, the UE measures the characteristics of a transmit signal from a CSI-RS resource configured without differentiating subframe sets from each other. On the other hand, if the UE is informed that the characteristics of transmit signals are different from each other between the subframe sets, the UE determines CSI_x reported for specific subframe set_x by measuring characteristics of a transmit signal using only CSI-RS transmission subframes belonging to subframe set_x.

If the UE is informed that the characteristics of interference signals are the same between the subframe sets, the UE measures the characteristics of an interference signal from a CSI-IM resource configured without differentiating subframe sets from each other. On the other hand, if the UE is informed that the characteristics of interference signals are different from each other between the subframe sets, the UE determines CSI_x reported for specific subframe set_x by measuring characteristics of an interference signal using only the IMRs of CSI-IM configuration subframes belonging to subframe set_x.

With subframe sets configured, it is signaled whether or not characteristics of each of a CSI-RS configuration and a CSI-IM configuration are the same or independent between the subframe sets. If it is signaled that characteristics of each of a CSI-RS configuration and a CSI-IM configuration are the same or independent between the configured subframe sets, it is signaled whether individual configurations are periodic or aperiodic in a corresponding subframe set. If it is signaled that characteristics of each of the configured CSI-RS configuration and CSI-IM configuration is independent between configured subframe sets, the size of a window for measurement of a configuration in each subframe set is signaled on the subframe-by-subframe basis.

In the example of FIG. 21, when the measurement window for subframe set 0 is set to 1, and the measurement window for subframe set 1 is set to <multi>, only the CSI-RS and CSI-IM of the thirteenth subframe used for aperiodic PUSCH reporting of CSI0, which is triggered in the fourteenth subframe and reported in the eighteenth subframe, and all the CSI-RSs and CSI-IMs of the eighth subframe and the eighteenth subframe belonging to subframe set 1 are used to estimate CSI1 for aperiodic PUSCH reporting, which is triggered in the nineteenth subframe and reported in the twenty-third subframe.

Figure 22:
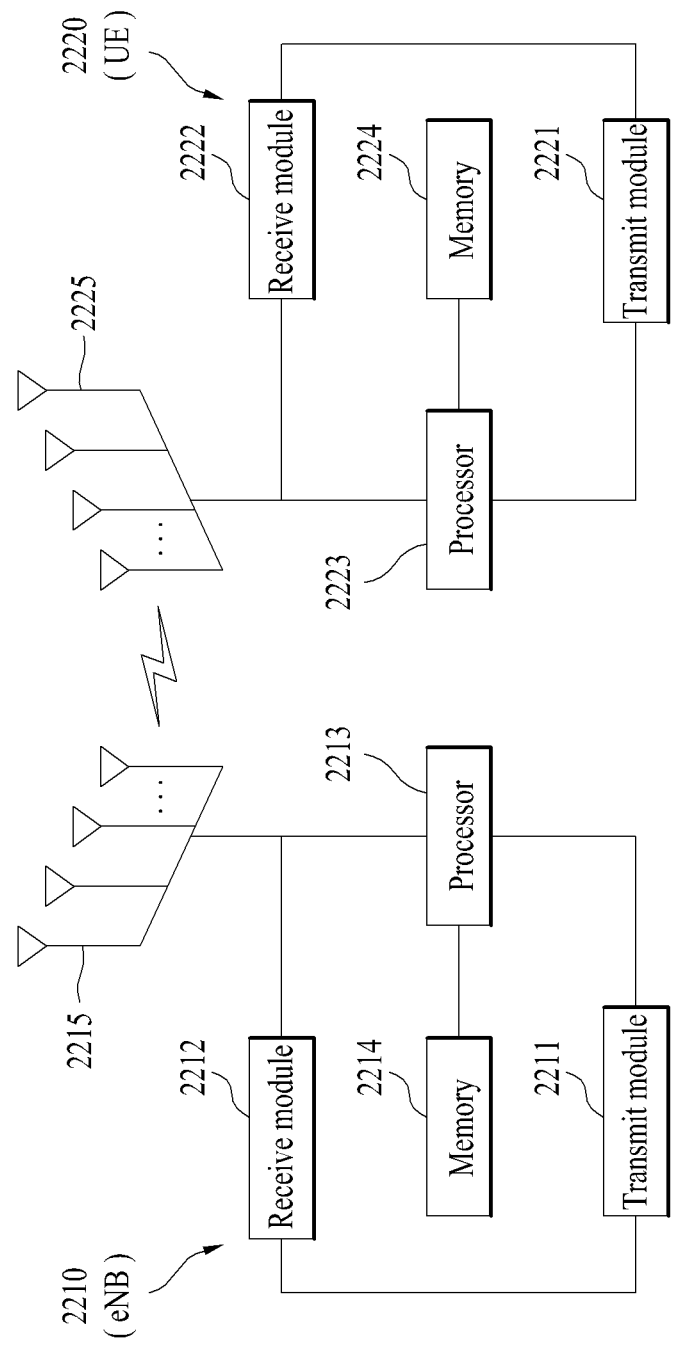
FIG. 22 is a diagram illustrating configurations of transceivers.

FIG. 22 is a diagram illustrating configurations of an eNB and a UE according to one embodiment of the present invention.

Referring to FIG. 22, an eNB 2210 may include a receive module 2211, a transmit module 2212, a processor 2213, a memory 2214, and a plurality of antennas 2215. The antennas 2215 represent an eNB that supports MIMO transmission and reception. The receive module 2211 may receive various signals, data and information from a UE on uplink. The transmit module 2212 may transmit various signals, data and information to a UE on downlink. The processor 2212 may control overall operation of the eNB 2210.

The processor 2212 of the eNB 2210 according to one embodiment of the present invention may operate to implement the embodiments described above.

Additionally, the processor 2212 of the eNB 2210 may function to operationally process information received by the eNB 2210 or information to be transmitted from the eNB 2210, and the memory 2214, which may be replaced with an element such as a buffer (not shown), may store the processed information for a predetermined time.

Referring to FIG. 22, a UE 2220 may include a receive module 2221, a transmit module 2222, a processor 2223, a memory 2224, and a plurality of antennas 2225. The antennas 2225 represent a UE that supports MIMO transmission and reception. The receive module 2221 may receive various signals, data and information from the eNB on downlink. The transmit module 2222 may transmit various signals, data and information to the eNB on uplink. The processor 2223 may control overall operation of the UE 2220.

The processor 2223 of the UE 2220 according to one embodiment of the present invention may perform operations necessary for implementation of the embodiments described above.

Additionally, the processor 2223 of the UE 2220 may function to operationally process information received by the UE 2220 or information to be transmitted from the UE 2220, and the memory 2224, which may be replaced with an element such as a buffer (not shown), may store the processed information for a predetermined time.

The configurations of the eNB and the UE as described above may be implemented such that the above-described embodiments are independently applied or two or more thereof are simultaneously applied, and description of redundant parts is omitted for clarity.

Description of the eNB 2210 in FIG. 22 may be equally applied to a relay as a downlink transmitter or an uplink receiver, and description of the UE 2220 may be equally applied to a relay as a downlink receiver or an uplink transmitter.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to have the widest scope corresponding to the principles and novel features disclosed herein The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to have the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The embodiments of the present invention as described above are applicable to various mobile communication systems.

The invention claimed is:

1. A method for reporting channel state information (CSI) by a user equipment (UE) having a plurality of CSI processes in a wireless communication system, the method comprising:
receiving information designating a specific CSI process of the plurality of CSI processes that the UE should use to determine CSI;
measuring a channel based on a CSI-reference signal (CSI-RS) configuration associated with the specific CSI process of the plurality of CSI processes;
measuring an interference based on a CSI-interference measurement (CSI-IM) configuration associated with the specific CSI process;
determining the CSI for the specific CSI process based on the measured channel and the measured interference by using one codebook type of a plurality of codebook types,
wherein the plurality of codebook types for CSI reporting are configured individually for each CSI process;

determining a precoding matrix from the one of the plurality of codebook types in order to report the CSI corresponding to the specific CSI process; and reporting the CSI determined for the specific CSI process.

2. The method according to claim 1, wherein a CSI-IM resource is indicated by either a CSI-IM configuration including subframes having same interference characteristics or a CSI-IM configuration including subframes having different interference characteristics.

3. The method according to claim 1, wherein the UE receives an information about whether or not averaging interferences measured in a plurality of subframes corresponding to the CSI-IM resource is allowed.

4. The method according to claim 3, wherein the information is received through radio resource control (RRC) signaling.

5. The method according to claim 1, wherein a signal for a Multi User-Multi Input Multi Output (MU-MIMO)-paired UE is transmitted in a portion of subframes corresponding to the CSI-IM resource.

6. The method according to claim 5, wherein the signal for the MU-MIMO paired UE is either a PDSCH (Physical Downlink Shared Channel) for the MU-MIMO-paired UE or a dummy signal obtained by applying a precoding matrix associated with the MU-MIMO-paired UE.

7. The method according to claim 1, wherein the measuring of the channel is performed using a non-zero power CSI-RS among the CSI-RS resource, and the measuring of the interference is performed using a zero-power CSI-RS among the CSI-IM resource.

8. The method according to claim 1, wherein the CSI is reported over an uplink channel, wherein the uplink channel is one of a physical uplink shared channel (PUSCH) or a physical uplink control channel (PUCCH).

9. A user equipment (UE) having a plurality of channel state information (CSI) processes configured in a wireless communication system, the UE comprising:

a receiver; and a processor, wherein the processor is configured to:

receive information designating a specific CSI process of the plurality of CSI processes that the UE should use to determine CSI;

measure a channel based on a CSI-reference signal (CSI-RS) resource configuration associated with the specific CSI process of the plurality of CSI processes;

measure an interference based on a CSI-interference measurement (CSI-IM) resource configuration associated with the specific CSI process;

determine the CSI for the specific CSI process based on the measured channel and the measured interference by using one codebook type of a plurality of codebook types, wherein the plurality of codebook types for CSI reporting are configured individually for each CSI process;

determine a precoding matrix from the one of the plurality of codebook types in order to report the CSI corresponding to the specific CSI process and report the CSI determined for the specific CSI process.

* * * * *